United States Patent
Wang et al.

(10) Patent No.: US 12,316,404 B2
(45) Date of Patent: May 27, 2025

(54) MULTI-ADAPTIVE PHASE-CHANGING DEVICE COMMUNICATIONS

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 42 days.

(21) Appl. No.: 18/548,019

(22) PCT Filed: Mar. 1, 2021

(86) PCT No.: PCT/US2021/020275
§ 371 (c)(1),
(2) Date: Aug. 25, 2023

(87) PCT Pub. No.: WO2022/186815
PCT Pub. Date: Sep. 9, 2022

(65) Prior Publication Data
US 2024/0154646 A1    May 9, 2024

(51) Int. Cl.
*H04L 1/02* (2006.01)
*H04B 7/026* (2017.01)
(Continued)

(52) U.S. Cl.
CPC ........... *H04B 7/026* (2013.01); *H04B 7/0695* (2013.01); *H04B 7/088* (2013.01)

(58) Field of Classification Search
CPC ... H04L 1/0054; H04L 1/0066; H04L 5/0023; H04B 3/232; H04B 7/0695; H04W 16/28; H04W 24/02; H04W 72/0446
(Continued)

(56) References Cited

U.S. PATENT DOCUMENTS

2015/0358129 A1   12/2015   Ryu et al.
2019/0044246 A1   2/2019    Pitsillides et al.
(Continued)

FOREIGN PATENT DOCUMENTS

CN   110225538   9/2019
CN   110839204   2/2020
(Continued)

OTHER PUBLICATIONS

"International Search Report and Written Opinion", Application No. PCT/US2021/020275, Nov. 17, 2021, 15 pages.
(Continued)

*Primary Examiner* — Khai Tran
(74) *Attorney, Agent, or Firm* — Colby Nipper PLLC

(57) ABSTRACT

In aspects, a base station establishes a wireless connection with a user equipment, UE. The base station determines to include at least a first adaptive phase-changing device, APD, and a second APD in a wireless communication path with the UE. In response to determining to include multiple APDs in the communication path, the base station determines a first surface configuration for a first surface of the first APD and a second surface configuration for a second surface of the second APD. The base station directs the first APD to apply the first surface configuration to the first surface and directs the second APD to apply the second surface configuration to the second surface. The base station and the UE communicate with the UE using wireless transmissions that travel along a wireless communication path that includes the first surface of the first APD and the second surface of the second APD.

20 Claims, 8 Drawing Sheets

(51) Int. Cl.
*H04B 7/06* (2006.01)
*H04B 7/08* (2006.01)

(58) Field of Classification Search
USPC .......................... 375/262, 260, 267
See application file for complete search history.

(56) References Cited

U.S. PATENT DOCUMENTS

| | | | |
|---|---|---|---|
| 2019/0208427 A1 | 7/2019 | Rofougaran et al. | |
| 2019/0238191 A1 | 8/2019 | Yoon et al. | |
| 2020/0220578 A1 | 7/2020 | Rofougaran et al. | |
| 2020/0344691 A1* | 10/2020 | Liu | H04W 52/028 |
| 2020/0366363 A1 | 11/2020 | Li et al. | |
| 2022/0321229 A1* | 10/2022 | Bucklew | H04B 13/02 |
| 2024/0365152 A1* | 10/2024 | Elshafie | H04B 17/25 |

FOREIGN PATENT DOCUMENTS

| | | |
|---|---|---|
| CN | 111010219 | 4/2020 |
| CN | 111245493 | 6/2020 |
| CN | 111983560 | 11/2020 |
| CN | 112272384 | 1/2021 |
| WO | 2022186815 | 9/2022 |

OTHER PUBLICATIONS

Belbase, et al., "Coverage, Capacity, and Error Rate Analysis of Multi-Hop Millimeter-Wave Decode and Forward Relaying", IEEE Access, May 27, 2019, 19 pages.
Liu, Yang, "Intelligent Reflecting Surface Meets Mobile Edge Computing: Enhancing Wireless Communications for Computation Offloading", Jan. 28, 2020, 12 pages.
Teyeb, et al., "Integrated Access Backhauled Networks", Jun. 21, 2019, 5 pages.
Zhang, et al., "Augmenting Transmission Environments for Better Communications: Tunable Reflector Assisted MmWave WLANs", Apr. 2020, 13 pages.
"Foreign Office Action", EP Application No. 21713838.7, Mar. 18, 2024, 5 pages.
"International Preliminary Report on Patentability", Application No. PCT/US2021/020275, Aug. 29, 2023, 12 pages.

* cited by examiner

MULTI-ADAPTIVE PHASE-CHANGING DEVICE COMMUNICATIONS

RELATED APPLICATION(S)

This application is a national stage entry of International Application No. PCT/US2021/020275, filed Mar. 1, 2021, the disclosure of which is incorporated herein by reference in its entirety.

BACKGROUND

Evolving wireless communication systems, such as fifth generation (5G) technologies and sixth generation (6G) technologies, use various techniques that increase data capacity relative to preceding wireless networks. As one example, 5G technologies transmit data using higher frequency ranges, such as a frequency band above 6-Gigahertz (GHz). As another example, the 5G technologies support multiple-input, multiple-output (e.g., MU-MIMO, Massive MIMO) communications that use multiple transmission and/or reception paths.

While the higher frequency ranges for these evolving wireless communication systems can be used to increase data capacity, transmitting and recovering information using these higher frequency ranges also poses challenges. The higher-frequency signals and MIMO transmissions, for instance, are more susceptible to multipath fading and other types of path loss, which lead to recovery errors at a receiver. To illustrate, an urban environment includes multiple obstructions (e.g., buildings, foliage, vehicles) that may prevent and/or block higher frequency transmissions from reaching an intended receiver. It therefore becomes desirable to correct for the signal distortions in order to obtain sustainable performance benefits (e.g., increased data capacity) provided by these approaches.

SUMMARY

This document describes techniques and apparatuses for multi-adaptive phase-changing device (multi-APD) communications, where multi-APD communications correspond to communications that use the surfaces of multiple APDs to route and/or transform wireless signals. In aspects, a base station establishes a wireless connection with a user equipment, UE. The base station determines to include at least a first adaptive phase-changing device, APD, and a second APD in a wireless communication path with the UE. In response to determining to include multiple APDs in the communication path, the base station determines a first surface configuration for a first surface of the first APD and a second surface configuration for a second surface of the second APD. The base station directs the first APD to apply the first surface configuration to the first surface and directs the second APD to apply the second surface configuration to the second surface. The base station and the UE communicate with the UE using wireless transmissions that travel along a wireless communication path that includes the first surface of the first APD and the second surface of the second APD.

The details of one or more implementations for multi-APD communications are set forth in the accompanying drawings and the following description. Other features and advantages will be apparent from the description, the drawings, and the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects for multi-APD communications are described with reference to the following drawings. The same numbers are used throughout the drawings to reference like features and components.

DETAILED DESCRIPTION

Figure 1:
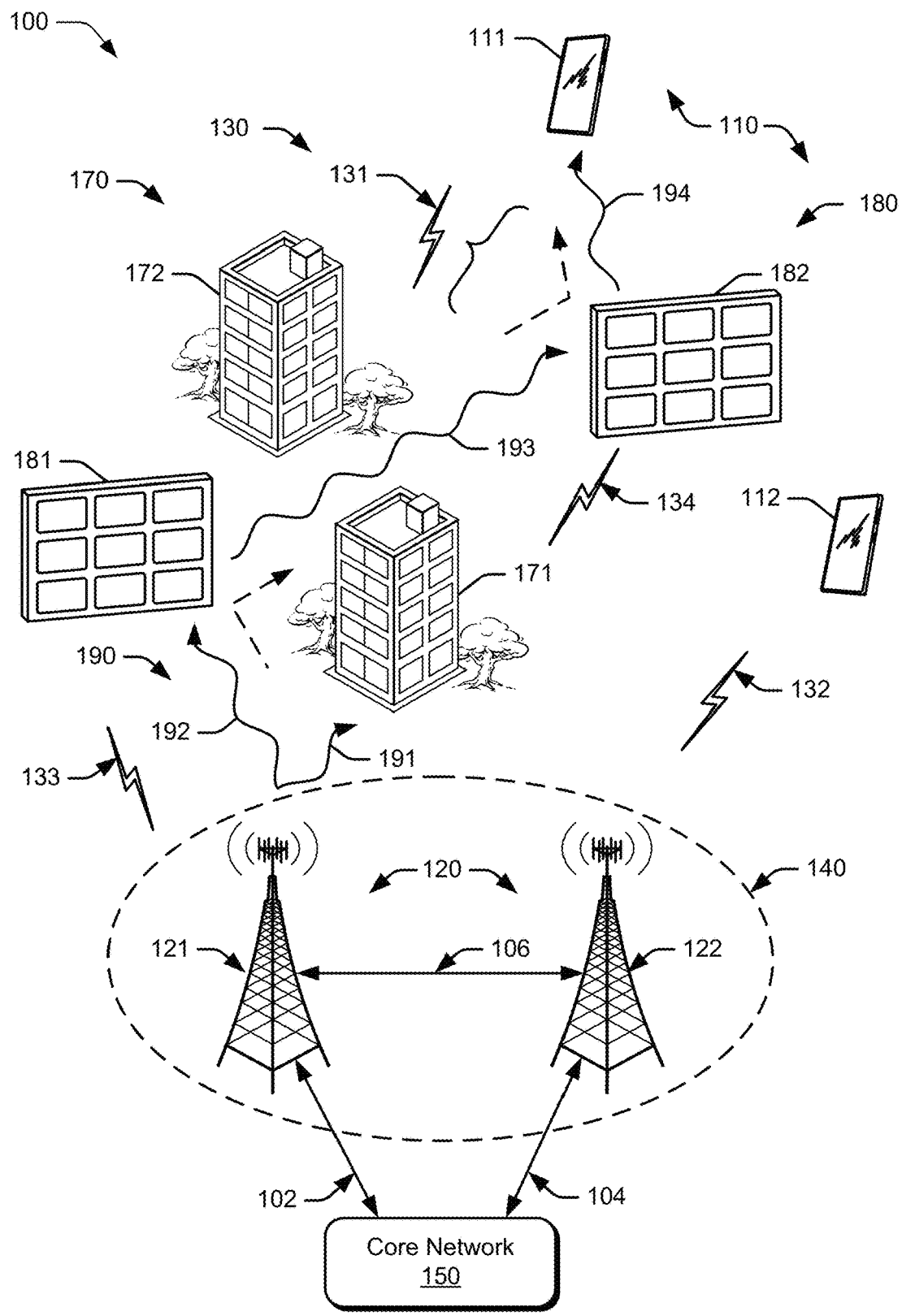
FIG. 1 illustrates an example operating environment that can be used to implement various aspects of multi-APD communications.

Evolving wireless communication systems use various techniques to meet increasing usage demands of preceding wireless communication systems. To illustrate, next-generation user devices implement applications that consume larger quantities of user data relative to preceding applications. To deliver these larger quantities of user data, evolving wireless communication systems (e.g., 5G, 6G) transmit at higher frequencies (e.g., millimeter wave (mmWave) range), sometimes with MIMO (e.g., MU-MIMO, Massive MIMO), to increase data capacity. While higher frequencies and MIMO communications provide higher data throughput, channel conditions can negatively impact these techniques. As an example, mmWave signals have high throughput under Line of Sight (LoS) conditions, but reflections create multipath and frequency-selective fading that may increase recovery errors at the receiver. Various environments, such as dense urban areas, include multiple obstructions that further diminish signal quality and make the deployment of high-frequency communications in these environments more difficult.

Adaptive phase-changing devices (APDs) include a Reconfigurable Intelligent Surface (RIS) that, when properly configured, modifies propagating signals to correct for, or reduce, errors introduced by communication path(s), such as small-scale fading and fading MIMO channels. Generally, an RIS includes configurable surface materials that shape how incident signals striking the surface of the materials are transformed. To illustrate, the configuration of the surface materials can affect the phase, amplitude, and/or polarization of the transformed signal. Thus, modifying a surface configuration of the RIS changes how incident signals are transformed when they reflect off the RIS.

In aspects, a first (transmitting) wireless device (e.g., a base station, a user equipment) uses multiple APDs to route wireless transmissions to a second (receiving) wireless device (e.g., a user equipment or a base station). In other words, the first wireless device uses the respective surfaces of multiple intermediate devices (e.g., APDs) to route a transmission around obstructions and/or to improve signal quality. To illustrate, the first wireless device transmits a first wireless signal towards a first APD surface that directs a (first) reflected wireless signal towards a second APD surface. Upon striking the second APD surface, the (second) reflected signal propagates from the second APD surface and towards the second wireless device in a LoS manner. Thus, using multiple APD surfaces allows a wireless system to extend a high-band (e.g., above 6 GHz or THz) coverage area (relative to single-hop or no-hop communications) by routing wireless signals around obstructions that might otherwise cause recovery errors at a receiver and/or prevent a wireless signal from reaching the receiver. In some aspects, the APD surfaces alternatively or additionally transform the reflected signal to mitigate destructive interference as further described.

While features and concepts of the described systems and methods for multi-APD communications (e.g., communications that use the surfaces of multiple APDs to route and/or transform wireless signals) can be implemented in any number of different environments, systems, devices, and/or various configurations, various aspects of multi-APD communications are described in the context of the following example devices, systems, and configurations.

Example Environment

FIG. 1 illustrates an example environment 100, which includes multiple user equipment 110 (UE 110), illustrated as UE 111 and UE 112. Each UE can communicate with one or more base stations 120 (illustrated as base stations 121 and 122) through one or more wireless communication links 130 (wireless link 130), illustrated as wireless links 131 and 132. The wireless links also include a wireless link 133 and/or a wireless link 134 that the base stations 120 use to communicate with one or more adaptive phase-changing devices 180 (APDs 180), illustrated as APD 181 and APD 182. In aspects, the base station 120 communicates with the APD 180 to control a surface configuration and/or position of the APD 180 at certain points in time. In other implementations, the base station 120 includes a wireline interface for communicating APD-control information (e.g., surface configuration, timing information, position information) to the APD 180. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device, such as a sensor, relay, or actuator. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, distributed base stations, or the like, or any combination thereof.

One or more base stations 120 communicate with the UE 110 using the wireless links 131 and 132, which may be implemented as any suitable type of wireless link. In one example, the base station 121 communicates with the UE 111 using the wireless link 131 and multiple APDs to route and/or transform wireless signals. The base station 122 communicates with the UE 112 using the wireless link 132 without using the surface of an APD to route and/or transform wireless signals. The wireless links 131 and 132 include control-plane information and/or user-plane data, such as downlink user-plane data and control-plane information communicated from the base stations 120 to the UEs 110, uplink of other user-plane data and control-plane information communicated from the UEs 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), fifth-generation New Radio (5G NR), sixth-generation (6G), and so forth. As one example, the multiple wireless links can include a first sub-6 Gigahertz (GHz) anchor link and a second, above 6 GHz link. Multiple wireless links 130 may be aggregated using a carrier aggregation or multi-connectivity technology to provide a higher data rate for the UE 110. Multiple wireless links 130 from multiple base stations 120 may be configured for Coordinated Multipoint (CoMP) communication with the UE 110.

In some implementations, the wireless links (e.g., the wireless links 131 and 132) utilize wireless signals that one or more intermediate devices (e.g., APD 180) reflect or transform, such as reflections that route the wireless signals around obstructions 170 (illustrated as obstruction 171 and obstruction 172). Although the obstruction 171 and obstruction 172 are shown as buildings and foliage, obstructions can range from a more-temporary obstruction such as water vapor or a moving vehicle, to a seasonal obstruction such as the deciduous trees shown, to a more-permanent obstruction such as the building shown. For instance, the base station 121 uses the APD 181 and APD 182 to propagate ray(s) 190 towards (and/or receive from) the UE 111, illustrated as signal ray 191, signal ray 192, signal ray 193, and signal ray 194. In the environment 100, the signal ray 190 corresponds to individual rays of a narrow-beam or wide-beam (up to and including omnidirectional) wireless signal used to implement the wireless link 131, such as a downlink wireless signal (illustrated in FIG. 1) from the base station 121 to the UE 111 and/or an uplink wireless signal (not illustrated in FIG. 1) from the UE 111 to the base station 121. As part of communicating with the UE 111 through wireless link 131, the base station 121 transmits a downlink wireless signal intended for the UE 111. A first ray of the downlink wireless signal (e.g., the signal ray 191) propagates toward the UE 111 in a line-of-sight (LoS) manner, where an obstruction 171 dynamically blocks and/or attenuates the LoS signal ray 191. A second ray of the downlink wireless signal (e.g., the signal ray 192) propagates toward the APD 181. The second signal ray 192 strikes the surface of the APD 181 and transforms into a third signal ray 193 that propagates toward the APD 182 (instead of in an LoS manner towards the UE 111 which would be blocked by the obstruction 172). The third signal ray 193 strikes the surface of the APD 182 and transforms into a fourth signal ray 194 that propagates towards the UE 111. The environment 100 illustrates the obstructions 170 as buildings and foliage, but many other materials may obstruct the LoS signal ray, such as vehicles, human bodies, fog or rain, and so forth.

The base station 120 can configure an RIS of the APD 180 to direct how the RIS alters signal properties (e.g., direction, phase, amplitude and/or polarization) of a wireless signal.

This includes configuring multiple APD surfaces to route and/or transform a wireless signal between APDs as illustrated by the signal ray 192, the signal ray 193, and the signal ray 194. In aspects, the base station 120 communicates respective RIS surface-configuration information to the APD 181 and the APD 182 using the wireless link 133 and/or the wireless link 134, which may include any combination of: an adaptive phase-changing device physical downlink shared channel (APD-PDSCH), an adaptive phase-changing device physical uplink shared channel (APD-PUSCH), an adaptive phase-changing device physical downlink control channel (APD-PDCCH), and/or an adaptive phase-changing device physical uplink control channel (APD-PUCCH).

In various implementations of multi-APD communications, the base station 120 determines surface configuration(s) for multiple APDs 180 that direct or steer reflections of wireless signals between the base station 120 and the UE 110, such as surface configurations that, collectively, route and/or transform the uplink and/or downlink wireless signals using multiple APD surfaces as further described. In aspects, the base station 120 determines the surface configurations using one or more beam-sweeping procedures. Alternatively or additionally, the base station 120 determines surface configuration(s) for the APD 180 based on location information, downlink signal-quality measurements/parameters received from the UE 110, uplink-quality measurements/parameters generated by the base station 120, and/or historical records regarding previous successful and unsuccessful uplink and/or downlink wireless communications including information such as APD identifiers (APD-RNTI), APD locations, UE locations, downlink/uplink (DL/UL) signal strength/quality measurement reports, APD surface configurations (e.g., indices), APD surface configuration codebooks, and so forth.

The base stations 120 collectively form at least part of a Radio Access Network 140 (e.g., RAN, Evolved Universal Terrestrial Radio Access Network, E-UTRAN, 5G NR RAN or NR RAN). The base stations 121 and 122 connect, at 102 and 104 respectively, to a core network 150 through an NG2 interface for control-plane signaling and an NG3 interface for user-plane data communications when connecting to a 5G core network, or using an S1 interface for control-plane signaling and user-plane data communications when connecting to an Evolved Packet Core (EPC) network. The UE 110 may connect, via the RAN 140 and core network 150, to public networks such as the Internet, to interact with a remote service (not illustrated in FIG. 1).

The base stations 121 and 122 can communicate using an Xn Application Protocol (XnAP) through an Xn interface or using an X2 Application Protocol (X2AP) through an X2 interface, at 106, to exchange user-plane and control-plane data. Alternatively or additionally, the base stations 121 and 122 communicate with one another using a wireless integrated access backhaul (IAB) link (not illustrated in FIG. 1), where one of the base stations acts as a donor base station and the other base station acts as a node base station. In some aspects, the base stations 121 and 122 include the surface of one or more APDs 180 in a communication path for the IAB link such that the APDs route and/or transform the wireless signals associated with IAB link communications as further described.

Example Devices

Figure 2:
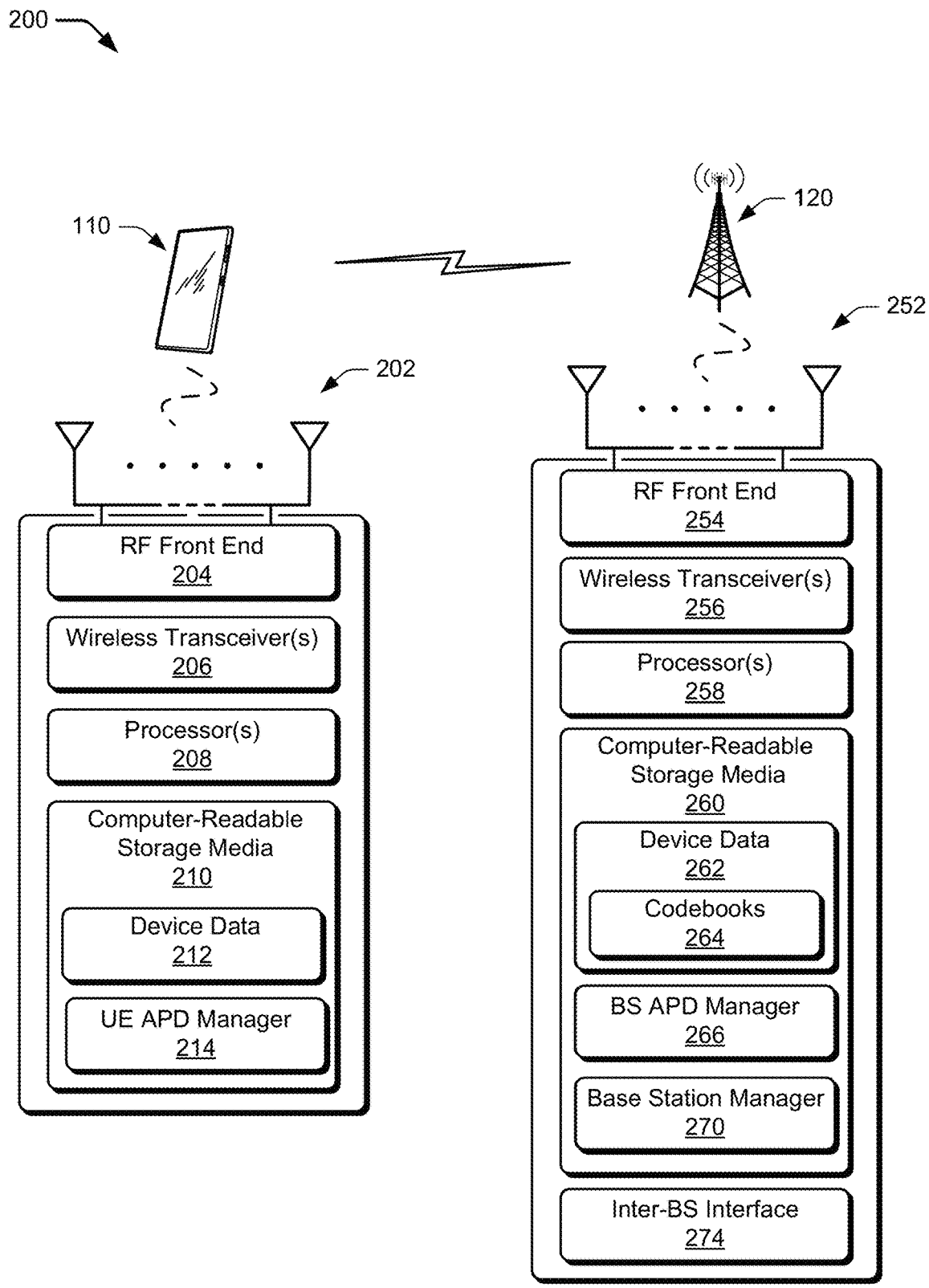
FIG. 2 illustrates an example device diagram of entities that can implement various aspects of multi-APD communications.

FIG. 2 illustrates an example device diagram 200 of the UE 110 and base station 120. Generally, the device diagram 200 describes network entities that can implement various aspects of multi-APD communications. FIG. 2 shows respective instances of the UE 110 and the base station 120. The UE 110 or the base station 120 may include additional functions and interfaces that are omitted from FIG. 2 for the sake of visual brevity. The UE 110 includes antennas 202, a radio-frequency front end 204 (RF front end 204), and one or more wireless transceivers 206 (e.g., radio-frequency transceivers), such as any combination of an LTE transceiver, a 5G NR transceiver, and/or a 6G transceiver for communicating with the base station 120 in the RAN 140. The RF front end 204 of the UE 110 can couple or connect the wireless transceivers 206 to the antennas 202 to facilitate various types of wireless communication.

The antennas 202 of the UE 110 may include an array of multiple antennas that are configured in a manner similar to or different from each other. The antennas 202 and the RF front end 204 can be tuned to, and/or be tunable to, one or more frequency bands defined by communication standards (e.g., 3GPP LTE, 5G NR and/or 6G) and implemented by the wireless transceiver(s) 206. Additionally, the antennas 202, the RF front end 204, and/or the wireless transceiver(s) 206 may be configured to support beam-sweeping for the transmission and reception of communications with the base stations 120. By way of example and not limitation, the antennas 202 and the RF front end 204 can be implemented for operation in sub-gigahertz bands, sub-6 GHz bands, and/or above-6 GHz bands that are defined by the 3GPP LTE and 5G NR communication standards (e.g., 57-64 GHz, 28 GHz, 38 GHz, 71 GHz, 81 GHz, or 92 GHz bands).

The UE 110 also includes processor(s) 208 and computer-readable storage media 210 (CRM 210). The processor 208 may be a single-core processor or a multiple-core processor implemented with a homogenous or heterogeneous core structure. The computer-readable storage media described herein excludes propagating signals. CRM 210 may include any suitable memory or storage device such as random-access memory (RAM), static RAM (SRAM), dynamic RAM (DRAM), non-volatile RAM (NVRAM), read-only memory (ROM), or Flash memory useable to store device data 212 of the UE 110. The device data 212 includes any combination of user data, multimedia data, applications, and/or an operating system of the UE 110. In implementations, the device data 212 stores processor-executable instructions that are executable by the processor(s) 208 to enable user-plane communication, control-plane signaling, and user interaction with the UE 110.

The CRM 216 of the UE 110 may optionally include a user equipment adaptive phase-changing device manager 214 (UE APD manager 214). Alternatively or additionally, the UE APD manager 214 may be implemented in whole or part as hardware logic or circuitry integrated with or separate from other components of the UE 110. In aspects, the UE APD manager 214 receives APD-access information for using a surface of an APD, such as reflection-access information that indicates time information on when to use the APD surface, configurable surface element information that indicates portions of the APD surface available to the UE 110, and/or transmission-direction information (e.g., beam-direction information for transmissions from the UE). The UE APD manager 214 directs the UE 110 to transmit communications with the base station 120 by using a surface of the APD and based on the APD-access information. In some implementations, the use of APDs in the communication path can be invisible to the UE and, in such implementations, the UE 110 need not include an APD manager 214.

The device diagram for the base station 120, shown in FIG. 2, includes a single network node (e.g., a gNode B). The functionality of the base station 120 may be distributed across multiple network nodes or devices and may be distributed in any fashion suitable to perform the functions described herein. The nomenclature for this distributed base station functionality varies and includes terms such as Central Unit (CU), Distributed Unit (DU), Baseband Unit (BBU), Remote Radio Head (RRH), and/or Remote Radio Unit (RRU). The base station 120 includes antennas 252, a radio-frequency front end 254 (RF front end 254), one or more wireless transceiver(s) 256 (e.g., radio-frequency transceivers) for communicating with the UE 110, such as LTE transceivers, 5G NR transceivers, and/or 6G transceivers. The RF front end 254 of the base station 120 can couple or connect the wireless transceivers 256 to the antennas 252 to facilitate various types of wireless communication. The antennas 252 of the base station 120 may include an array of multiple antennas that are configured in a manner similar to or different from each other. The antennas 252 and the RF front end 254 can be tuned to, and/or be tunable to, one or more frequency bands defined by communication standards (e.g., 3GPP LTE, 5G NR and/or 6G) and implemented by the wireless transceivers 256. Additionally, the antennas 252, the RF front end 254, and/or the wireless transceivers 256 may be configured to support beamforming, such as Massive-MIMO, for the transmission and reception of communications with the UE 110 and/or another base station 120.

The base station 120 also includes processor(s) 258 and computer-readable storage media 260 (CRM 260). The processor 258 may be a single-core processor or a multiple-core processor composed of a variety of materials, such as silicon, polysilicon, high-K dielectric, copper, and so on. CRM 260 may include any suitable memory or storage device such as RAM, SRAM, DRAM, NVRAM, ROM, or Flash memory useable to store device data 262 of the base stations 120. The device data 262 includes network-scheduling data, radio resource-management data, applications, and/or an operating system of the base station 120, which are executable by processor(s) 258 to enable communication with the UE 110. The device data 262 also includes codebooks 264. The codebooks 264 may include any suitable type or combination of codebooks, including surface-configuration codebooks that store surface-configuration information for a RIS of an APD and beam-sweeping codebooks that store patterns, sequences, APD-position information, and/or timing information for implementing multiple surface-configurations useful to direct an APD to perform a variety of reflective beamforming. In some aspects, the surface-configuration codebooks and beam-sweeping codebooks include phase-vector information, angular information (e.g., calibrated to respective phase vectors), and/or beam-configuration information.

In aspects, the CRM 260 of the base station 120 also includes a base station-adaptive phase-changing device manager 266 (BS APD manager 266) for managing APD usage in communication path(s) with the UE 110. Alternatively or additionally, the BS APD manager 266 may be implemented in whole or part as hardware logic or circuitry integrated with or separate from other components of the base station 120. In aspects, the BS APD manager 266 identifies one or more APDs near the UE 110 and determines when to utilize the APD(s) in the communication path. This can include determining to use a single APD in the communication path or determining to use multiple APDs in the communication path. The BS APD manager 266 also determines surface configurations for the APD (e.g., RIS configurations), such as initial surface configurations and/or surface reconfigurations based on link-quality measurements, measurement reports, and/or other values as further described. In some aspects, the BS APD manager 266 determines a respective surface configuration for each APD of multiple APDs to route and/or transform wireless signals between a first (transmitting) device and a second (receiving) device using the surfaces of the multiple APDs.

In some aspects, the BS APD manager 266 manages communications with one or more APDs using one or more of: an adaptive phase-changing device physical downlink control channel (APD-PDCCH), an adaptive phase-changing device physical uplink control channel (APD-PUCCH), an adaptive phase-changing device physical downlink shared channel (APD-PDSCH), and/or an adaptive phase-changing device physical uplink shared channel (APD-PUSCH). As one example, the BS APD manager 266 assigns an APD-specific adaptive phase-changing device radio network temporary identifier (APD-RNTI) to each APD and uses the APD-RNTI to direct communications to a particular APD, such as that described with reference to FIGS. 4 and 5.

The CRM 260 also includes a base station manager 270 for managing various functionalities and communication interfaces of the base stations 120. Alternatively or additionally, the base station manager 270 may be implemented in whole or in part as hardware logic or circuitry integrated with or separate from other components of the base stations 120. In at least some aspects, the base station manager 270 configures the antennas 252, RF front end 254, and wireless transceivers 256 for communication with the UE 110 (e.g., the wireless link 131, the wireless link 132), and/or the APD 180 (e.g., the wireless link 133, the wireless link 134). The base station 120 sometimes includes a core network interface (not shown) that the base station manager 270 configures to exchange user-plane data and control-plane information with core network functions and/or entities.

Figure 3:
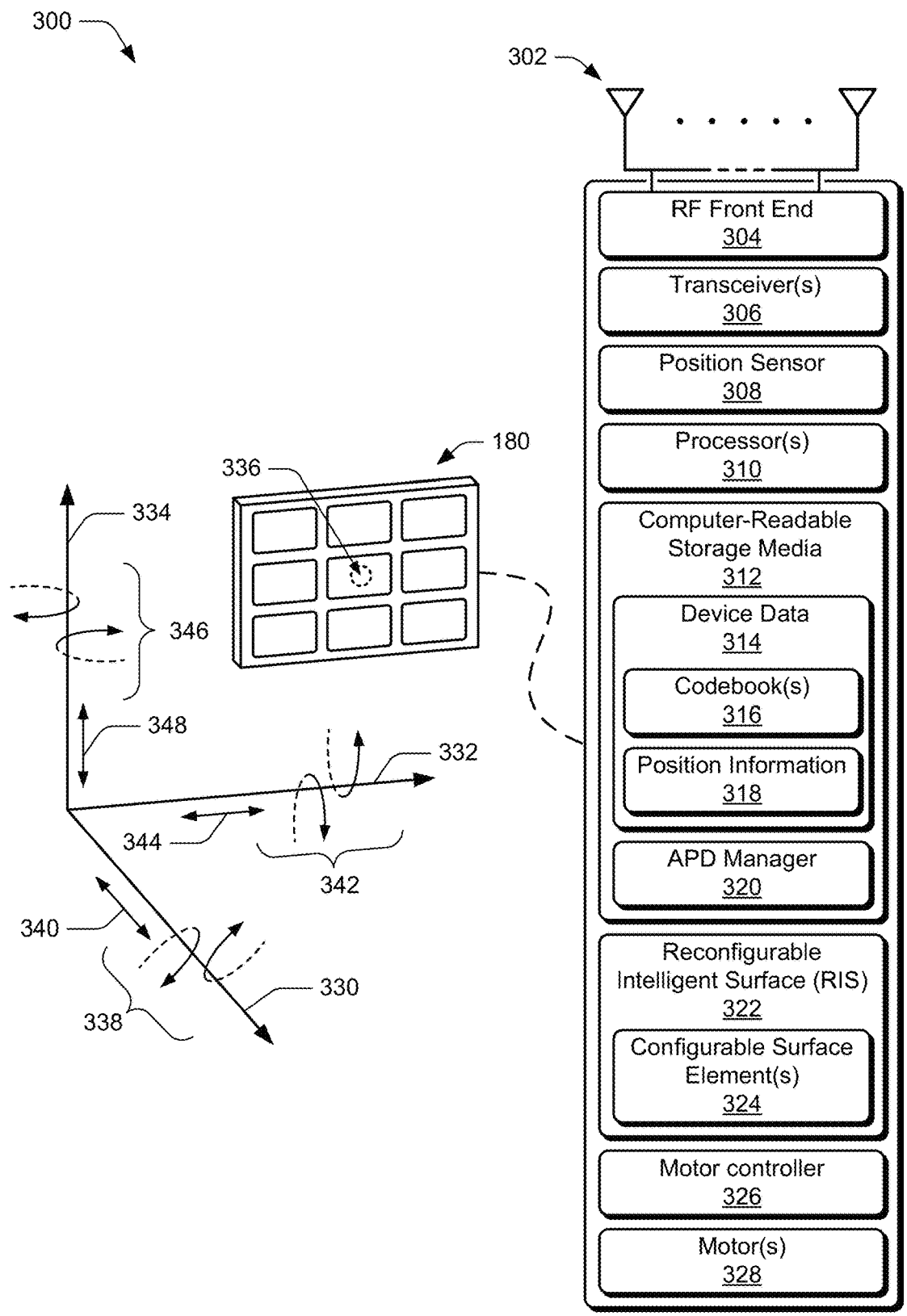
FIG. 3 illustrates an example device diagram of an adaptive phase-changing device that can be used in accordance with one or more aspects of multi-APD communications.

FIG. 3 illustrates an example device diagram 300 of the APD 180. Generally, the device diagram 300 describes an example entity with which various aspects of multi-APD communications can be implemented but may include additional functions and interfaces that are omitted from FIG. 3 for the sake of visual clarity. The APD 180 includes one or more antenna(s) 302, a radio frequency front end 304 (RF front end 304), and one or more radio-frequency transceivers 306 for wirelessly communicating with the base station 120 and/or the UE 110. The APD 180 can also include a position sensor 308, such as a Global Navigation Satellite System (GNSS) module, that provides position information based on a location of the APD 180.

The antenna(s) 302 of the APD 180 may include an array of multiple antennas that are configured in a manner similar to or different from each other. Additionally, the antennas 302, the RF front end 304, and the transceiver(s) 306 may be configured to support beamforming for the transmission and reception of communications with the base stations 120. By way of example and not limitation, the antennas 302 and the RF front end 304 can be implemented for operation in sub-gigahertz bands, sub-6 GHz bands, and/or above 6 GHz bands. Thus, the antenna 302, the RF front end 304, and the transceiver(s) 306 provide the APD 180 with an ability to receive and/or transmit communications with the base station 120, such as information transmitted using the wireless links 133 and/or 134 as further described.

The APD 180 includes processor(s) 310 and computer-readable storage media 312 (CRM 312). The processor 310 may be a single-core processor or a multiple-core processor implemented with a homogenous or heterogeneous core-structure. The computer-readable storage media described herein excludes propagating signals. CRM 312 may include any suitable memory or storage device such as RAM, SRAM, DRAM, NVRAM, ROM, or Flash memory useable to store device data 314 of the APD 180. The device data 314 includes user data, multimedia data, applications, and/or an operating system of the APD 180, which are executable by processor(s) 310 to enable dynamic configuration of the APD 180 as further described. The device data 314 also includes one or more codebooks 316 of any suitable type or combination and position information 318 of the APD 180. The position information 318 may be obtained or configured using the position sensor 308 or programmed into the APD 180, such as during installation. The position information 318 indicates a position of the APD 180 and may include a location, geographic coordinates, orientation, elevation information, or the like. A base station 120, by way of a BS APD manager 266, can use the position information 318 in computing angular or distance information, such as between the base station 120 and APD 180 and/or between the APD 180 and a UE 110 of interest. The codebooks 316 can include surface-configuration codebooks that store surface-configuration information for a RIS of an APD and beam-sweeping codebooks that store patterns, sequences, or timing information (e.g., phase vectors and reflection identifiers) for implementing multiple surface-configurations useful to direct an APD to perform a variety of reflective beamforming. In some aspects, the surface-configuration codebooks and beam-sweeping codebooks include phase-vector information, angular information (e.g., calibrated to respective phase vectors), and/or beam-configuration information.

In aspects of multi-APD communications, the CRM 312 of the APD 180 includes an adaptive phase-changing device manager 320 (APD manager 320). Alternatively or additionally, the APD manager 320 may be implemented in whole or part as hardware logic or circuitry integrated with or separate from other components of the APD 180. Generally, the APD manager 320 manages a surface configuration of the APD 180, such as by processing information exchanged with a base station over wireless link(s) 133 and/or 134 and using the information to configure a reconfigurable intelligent surface 322 (RIS 322) of the APD 180. To illustrate, the APD manager 320 receives an indication of a surface configuration over the wireless links 133 (an APD control channel), extracts the surface configuration from the codebooks 316 using the indication, and applies the surface configuration to the RIS 322. Alternatively or additionally, the APD manager 320 initiates the transmission of uplink messages to the base station over the wireless links 133, such as acknowledgments/negative acknowledgments (ACKs/NACKs) for various APD configuration or management commands. In some aspects, the APD manager 320 receives an indication of a beam-sweeping pattern (e.g., beam-sweeping pattern index) over the wireless links 133 and/or 134 and applies a sequence of various surface configurations to the RIS based on the beam-sweeping pattern and/or in accordance with a synchronization or pattern timing indicated by or received with the indication.

The RIS 322 of the APD 180 includes one or more configurable surface element(s) 324, such as configurable electromagnetic elements, configurable resonator elements, or configurable reflectarray antenna elements. Generally, the configurable surface elements 324 can be selectively or programmatically configured to control how the RIS 322 reflects (e.g., directionality) and/or transforms incident waveforms. By way of example and not of limitation, configurable electromagnetic elements include scattering particles that are connected electronically (e.g., through PIN diodes). Implementations use the electronic connection to arrange the scattering particles, such as based on principles of reflection, to control a directionality, phase, amplitude, and/or polarization of the transformed waveform (from the incident waveform). The RIS 322 can include array(s) of configurable surface element(s) 324, where an array can include any number of elements having any size.

In some aspects, a position and/or orientation of the APD 180 is configurable, and the APD 180 includes a motor controller 326 communicating with one or more motor(s) 328 that are operably coupled with a physical chassis of the APD 180. Based on command and control information, such as received from a base station 120, the motor controller 326 can send commands to the motors 328 that alter one or more kinematic behaviors of the motors 328, which may include any suitable type of stepper motor or servo. For example, the motor controller 326 may issue commands or control signals that specify a shaft rotation of a stepper motor in degrees, a shaft-rotation rate of a stepper motor in revolutions per minute (RPM), a linear movement of a linear motor millimeters (mm), a linear velocity of a linear motor in meters/second (m/s). The one or more motors 328, in turn, may be linked to mechanisms that mechanically position the physical chassis or a platform (e.g., avionics of a drone, a drive of a linear rail system, a gimble within a base station, a linear bearing within a base station) supporting the APD 180. Through the commands and signals that the motor controller 326 generates and sends to the motors 328, a physical position, location, or orientation of the APD 180 (and/or the platform supporting the APD 180) may be altered. In response to receiving a position configuration from a base station, the APD manager 320 communicates movement commands to the motor controller 326, such as through a software interface and/or hardware addresses, based on the position configuration. In aspects of multi-APD communications, a base station 120 may reposition or reorient one or more APDs 180 to improve or enable wireless signal reflections to be directed to the UE 110.

Generally, the APD 180 can include multiple motors, where each motor corresponds to a different rotational or linear direction of movement. Examples of motor(s) 328 that can be used to control orientation and location of the APD include linear servo motors that might be part of a (i) rail system mounting for the APD, (ii) motors controlling a direction and pitch, yaw, roll of a drone carrying the APD, (iii) radial servo or stepper motors that rotate an axis if the APD is in a fixed position or on a gimbal, and so on. For clarity, the motor controller 326 and the motors 328 are illustrated as being a part of the APD 180, but in alternative or additional implementations, the APD 180 communicates with motor controllers and/or motors external to the APD. To illustrate, the APD manager 320 communicates a position configuration to a motor controller that mechanically positions a platform or chassis that supports the APD 180. In aspects, the APD manager 320 communicates the position configuration to the motor controller using a local wireless link, such as Bluetooth °, Zigbee™ IEEE 802.15.4, or a hardwire link. The motor controller then adjusts the platform based on the position configuration using one or more motors. The platform can correspond to, or be attached to, any suitable mechanism that supports rotational and/or linear adjustments, such as a drone, a rail-propulsion system, a hydraulic lift system, and so forth.

As shown in FIG. 3, a position of the APD 180 may be defined with respect to a three-dimensional coordinate system in which an X-axis 330, Y-axis 332, and Z-axis 334 define a spatial area and provide a framework for indicating a position configuration through rotational and/or linear adjustments. While these axes are generally labeled as the X-axis, Y-axis, and Z-axis, other frameworks can be utilized to indicate the position configuration. To illustrate, aeronautical frameworks reference the axes as vertical (yaw), lateral (pitch), and longitudinal (roll) axes, while other movement frameworks reference the axes as vertical, sagittal, and frontal axes. As one example, position 336 generally points to a center position of the APD 180 that corresponds to a baseline position (e.g., position (0,0,0) using XYZ coordinates).

In aspects, the APD manager 320 communicates a rotational adjustment (e.g., rotational adjustments 338) around the X-axis 330 to the motor controller 326, where the rotational adjustment includes a rotational direction (e.g., clockwise or counterclockwise), an amount of rotation (e.g., degrees), and/or a rotation velocity. Alternatively or additionally, the APD manager 320 communicates a linear adjustment 340 along the X-axis, where the linear adjustment includes any combination of a direction, a velocity, and/or a distance of the adjustment. At times, the APD manager 320 communicates adjustments around the other axes as well, such as any combination of rotational adjustments 342 around the Y-axis 332, linear adjustments 344 along the Y-axis 332, rotational adjustments 346 around the Z-axis 334, and/or linear adjustments 348 along the Z-axis 334. Thus, the position configuration can include combinations of rotational and/or linear adjustments in all three degrees of spatial freedom. This allows the APD manager 320 to communicate physical adjustments to the APD 180. Alternatively or additionally, the APD manager communicates RIS surface configurations as further described.

Controlling Adaptive Phase-Changing Devices

Figure 4:
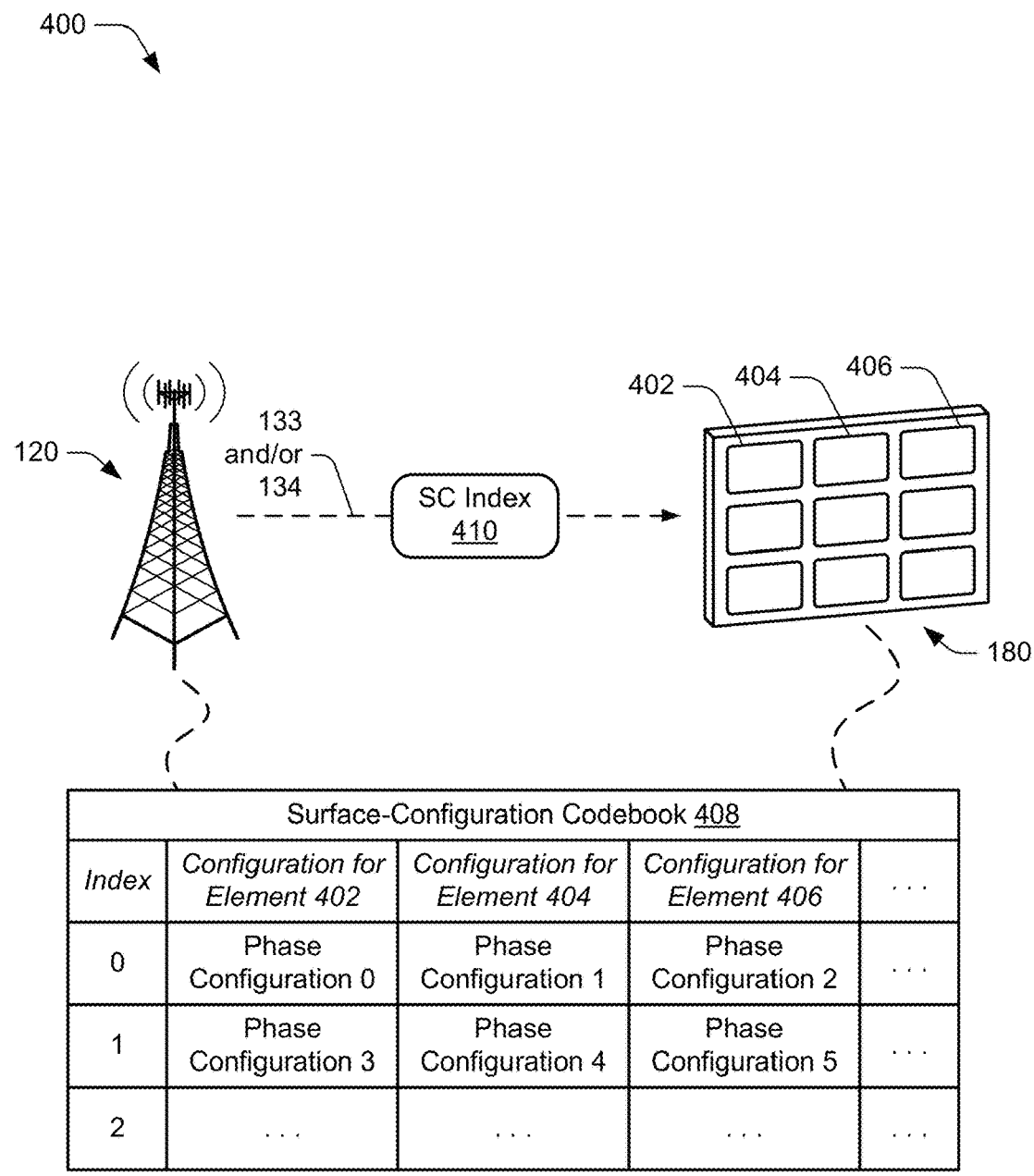
FIG. 4 illustrates an example environment in which a base station configures an adaptive phase-changing device in accordance with various aspects of multi-APD communications.

FIG. 4 illustrates an example 400 of configuring an APD 180 in accordance with one or more aspects of multi-APD communications. The example 400 includes instances of a base station 120 and an APD 180, which may be implemented similarly as described with reference to FIGS. 1-3. The RIS implemented by the APD 180 includes an array of "N" configurable surface elements, such as configurable surface element 402, configurable surface element 404, configurable surface element 406, and so forth, where "N" represents the number of configurable surface elements of the RIS. For visual brevity, the example 400 shows the base station 120 configuring a single APD 180, but the base station 120 may configure additional APDs (not illustrated in FIG. 4) for multi-APD communications, such as that described with reference to FIGS. 1-3 and 5-8.

In some aspects of multi-APD communications, a base station 120 configures the configurable surface elements of the RIS (e.g., configurable surface elements 402, 404, and 406) to direct how incident waveforms transform. For example, and with reference to FIG. 1, the base station 120 analyzes link-quality measurements, measurement reports, and/or other values (e.g., downlink-quality measurements, uplink-quality measurements, historical link-quality measurements) to identify channel impairments that affect a wireless link (e.g., wireless link 131, wireless link 132) with a UE. By way of example and not of limitation, various link-quality measurements that do not meet an acceptable performance level can indicate channel impairments, such as a delay spread between a first received signal and a last received signal (e.g., received multipath rays) exceeding an acceptable delay-spread threshold, an average time-delay (of the multipath rays) exceeding an acceptable average time-delay threshold, or a reference signal receive power (RSRP) falling below an acceptable power-level threshold. Alternative or additional measurements may be monitored, such as a received signal strength indicator (RSSI), power information, signal-to-interference-plus-noise ratio (SINR) information, channel quality indicator (CQI) information, channel state information (CSI), Doppler feedback, BLock Error Rate (BLER), Quality of Service (QoS), Hybrid Automatic Repeat reQuest (HARQ) information (e.g., first transmission error rate, second transmission error rate, maximum retransmissions), uplink SINR, timing measurements, error metrics, and so on. Alternatively or additionally, the base station 120 analyzes historical records using UE-location information to identify channel impairments. To illustrate, the base station 120 may determine, from analyzing the historical data records, that the UE location corresponds to a location with a history of channel impairment(s).

In response to identifying the channel impairments, the base station 120 selects a surface configuration for the RIS of the APD 180 that transforms wireless signals (used to implement a wireless link) to mitigate the channel impairments and improve a received signal quality. As one example, the base station 120 initiates a beamforming procedure as described with reference to FIG. 7, receives RSRP measurements from a UE as part of the beamforming procedure, and selects a surface configuration corresponding to the highest RSRP value. To support multi-APD communications, the base station 120 may select a respective surface configuration for the respective RIS of each APD.

In implementations, the base station 120 manages a configuration of the RIS of the APD 180 through use of a surface-configuration codebook 408, which can be preconfigured and/or known by both the base station 120 and the APD 180. The base station 120 and the APD 180 may maintain multiple surface-configuration codebooks, such as multiple surface-configuration codebooks that correspond to a respective (different) location of a (movable) APD. To illustrate, the base station 120 analyzes the surface-configuration codebook, which may be based on a current APD-location, to identify a surface configuration that modifies and/or transforms various signal characteristics of a wireless signal, such as modifying one or more desired phase characteristic(s), one or more amplitude characteristic(s), a polarization characteristic, and so forth. Thus, the base station 120 may first select a surface-configuration codebook based on a current APD location, then identify a surface configuration in the selected surface-configuration codebook.

In some implementations, the base station 120 uses historical records to select a surface configuration. For instance, the base station uses an estimated UE location to retrieve surface configurations from historical records that link geographic locations (e.g., latitude, longitude, altitude) to surface configurations that improve signal quality at the location.

In some cases, the base station 120 transmits a surface-configuration codebook 408 and/or a beam-sweeping codebook using the wireless link 133 and/or the wireless link 134 with the APD, such as by transmitting one or more messages using the APD-PDSCH. In aspects, the base station 120 uses the APD-PDSCH to communicate large quantities of data, to communicate data without low-latency requirements, and/or to communicate data without timing requirements. At times, the base station 120 transmits multiple surface-configuration codebooks (e.g., codebooks 264) to the APD 180, such as a first surface-configuration codebook for downlink communications, a second surface-configuration codebook for uplink communications, a phase-vector codebook, a beam-sweeping codebook, or the like. In response, the APD 180 stores the surface-configuration codebook(s) 408 and/or other codebooks in CRM, which is representative of codebook(s) 316 in CRM 312 as described with reference to FIG. 3. Alternatively or additionally, the APD 180 obtains the surface-configuration and other codebooks through manufacturing (e.g., programming), calibration, or installation processes that store the surface-configuration codebook(s) 408 and other codebooks in the CRM 312 of the APD 180 during assembly, installation, calibration, verification, or through an operator manually adding or updating the codebook(s).

The surface-configuration codebook 408 includes configuration information that specifies a surface configuration for some or all of the configurable surface elements (e.g., elements 324) forming the RIS of the APD 180. Alternatively or additionally, the surface-configuration codebook 408 includes APD positioning information (e.g., azimuth and/or elevation positions for the APD/APD surface). As one example, each index of the codebook corresponds to a phase vector with configuration information for each configurable surface element of the APD 180 and/or an APD position. Index 0, for instance, maps phase configuration 0 to configurable surface element 402, phase configuration 1 to configurable surface element 404, phase configuration 2 to configurable surface element 406, and so forth. Similarly, index 1 maps phase configuration 3 to configurable surface element 402, phase configuration 4 to configurable surface element 404, phase configuration 5 to configurable surface element 406, and so forth. The surface-configuration codebook 408 can include any number of phase vectors that specify configurations for any number of configurable surface elements, such that a first phase-vector corresponds to a first surface-configuration for the APD 180 (by way of configurations for each configurable surface element in the RIS), a second phase-vector corresponds to a second surface-configuration for the APD 180, and so on. In aspects, one or more surface configurations or phase vectors may be mapped or calibrated to specific angle information of incident and/or reflective wireless signals (e.g., reference signals), signal rays, beamformed transmission of the base station 120, or the like. Alternatively or additionally, the surface-configuration codebook 408 includes multiple APD positions for each surface configuration (e.g., a first entry/row in the codebook corresponds to a first surface configuration at a first APD position, a second entry/row in the codebook corresponds to the first surface configuration at a second APD position).

The surface-configuration information stored in a codebook can correspond to a full configuration that specifies an exact configuration (e.g., configure with this value) or a delta configuration that specifies a relative configuration (e.g., modify a current state by this value). In one or more implementations, the phase-configuration information specifies a directional increment and/or angular adjustment between an incident signal and a transformed signal. For instance, the phase configuration 0 can specify an angular-adjustment configuration for element 402 such that the configurable surface element 402 reflects the incident waveform with a "phase configuration 0" relative angular or directional shift.

As shown in FIG. 4, the base station 120 communicates an indication to the APD 180 that specifies a surface configuration. In the present example, the indication specifies a surface-configuration index 410 (SC index 410) that maps to a corresponding surface configuration of the APD 180. In response to receiving the indication, the APD manager 320 retrieves the surface configuration from the surface-configuration codebook 408 using the index and applies the surface configuration to the RIS. For example, the APD manager 320 configures each configurable surface element as specified by a respective entry in the surface-configuration codebook 408.

In various implementations, the base station 120 communicates timing information (not shown) to the APD 180, which may be included with a surface configuration. For instance, the base station 120 sometimes indicates, to the APD 180 and using the wireless link 133 or 134, a start time for the application of an indicated surface configuration or beam-sweeping pattern, a stop time that indicates when the APD may remove and/or change the surface configuration, and/or a timing offset (e.g., an advance or delay from the start time) on when to start applying the indicated surface configuration. By specifying the timing information, the base station 120 can synchronize and/or configure the APD 180 to a particular UE (e.g., UE 110). For example, the base station 120 configures the APD 180 for the particular UE by specifying start times, stop times, and/or timing offsets that correspond to a time slot assigned to the particular UE and/or to compensate for estimated propagation delays. To maintain synchronized timing with the base station 120, the APD 180 receives and/or processes a base station synchronizing signal.

To illustrate, the base station 120 assigns an identity to each APD, such as an adaptive phase-changing device radio network temporary identifier (APD-RNTI). For instance, the base station 120 and the APD 180 may perform a random-access channel (RACH) procedure to establish wireless communications with one another and, as part of the RACH procedure, the base station 120 dynamically assigns a particular APD-RNTI to the APD 180 (e.g., the base station 120 assigns a unique APD-RNTI to each APD that establishes wireless communications with the base station). As another example, each APD 180 receives a (static) APD-RNTI assignment during a provisioning procedure. The base station 120 may use the APD-RNTI associated with a particular APD to indicate APD-specific APD control information (e.g., surface-configuration information, timing information, location and/or movement information) to that APD. The base station 120, for instance, scrambles the respective APD control information with the respective APD-RNTI and transmits the (scrambled) APD-specific APD control information using the APD-PDCCH, where the APD-PDCCH may use high-band signals (e.g., above 6 GHz) or low-band signals (e.g., below 6 GHz). The respective APD assigned the particular APD-RNTI identifies the APD-PDCCH transmission and descrambles the APD control information using the APD-RNTI.

In some aspects, the base station 120 transmits APD control information to the APD 180 using an APD-PDSCH. For instance, the base station 120 may indicate to a particular APD, using the APD-PDCCH and the particular APD-RNTI, (scrambled) downlink control information that specifies resources of the APD-PDSCH (e.g., resource elements, channel coding, rate matching and/or modulation, etc.) that include the APD-specific APD control information. In response to receiving and descrambling the downlink control information, the particular APD recovers the APD control information transmitted over the APD-PDSCH. As another example, a message transmitted on the APD-PDSCH includes an APD identifier field, and the base station 120 sets the APD identifier field to a particular APD identity to indicate the APD control information included in the APD-PDSCH corresponds to a particular APD. The APD associated with the particular APD identity monitors the APD-PDSCH and, in response to identifying the particular APD identity in the APD identifier field, recovers the APD control information from the APD-PDSCH.

In aspects, the base station 120 transmits messages that indicate a surface configuration to the APD 180, similar to layer 2 or layer 3 control messages that communicate information using information elements (IEs). Alternatively or additionally, the base station 120 indicates control information using signaling, sometimes on a slot-by-slot basis, for quick surface-configuration changes (e.g., surface configurations applied on a slot-by-slot basis). In aspects, the base station 120 transmits surface-configuration indications and/or timing information using APD-PDCCH signaling, which allows the base station 120 to dynamically configure the APD 180 on a slot-by-slot basis. In some aspects, the base station 120 transmits a surface-configuration schedule to the APD that indicates when to apply different surface configurations to the RIS/configurable surface elements. Such a surface-configuration schedule may be used to implement a reflection-beam-sweeping procedure or an incident-beam-sweeping procedure.

When communicating with one or more APDs using the APD-PDSCH, the base station 120 may optionally enable an adaptive phase-changing device hybrid automatic-repeat request (APD-HARQ) process. Generally, when enabled, the APD-HARQ process directs the APD to transmit acknowledge/negative acknowledges (ACK/NACKs) to the base station, such as by transmitting the ACK/NACKs using the APD-PUCCH and/or the APD-PUSCH. By enabling the APD-HARQ process, the base station 120 receives, from the APD 180, confirmation messages that indicate when the APD has recovered the APD control information successfully (e.g., ACK) and retransmission requests when the APD fails to recover the APD control information. The base station 120 may disable and re-enable the APD-HARQ process.

Multi-APD Communications

Transmitting devices can use a surface of one or more APDs to direct or steer wireless signals toward receiving devices to improve received signal quality, such as by redirecting signals around obstructions that otherwise block high-band wireless transmissions (e.g., above 6 GHz). Dense urban areas may include multiple obstructions such that multiple APD surfaces can help reflect and/or redirect high-band wireless signals between transmitting and receiving devices to avoid those obstructions.

Figure 5:
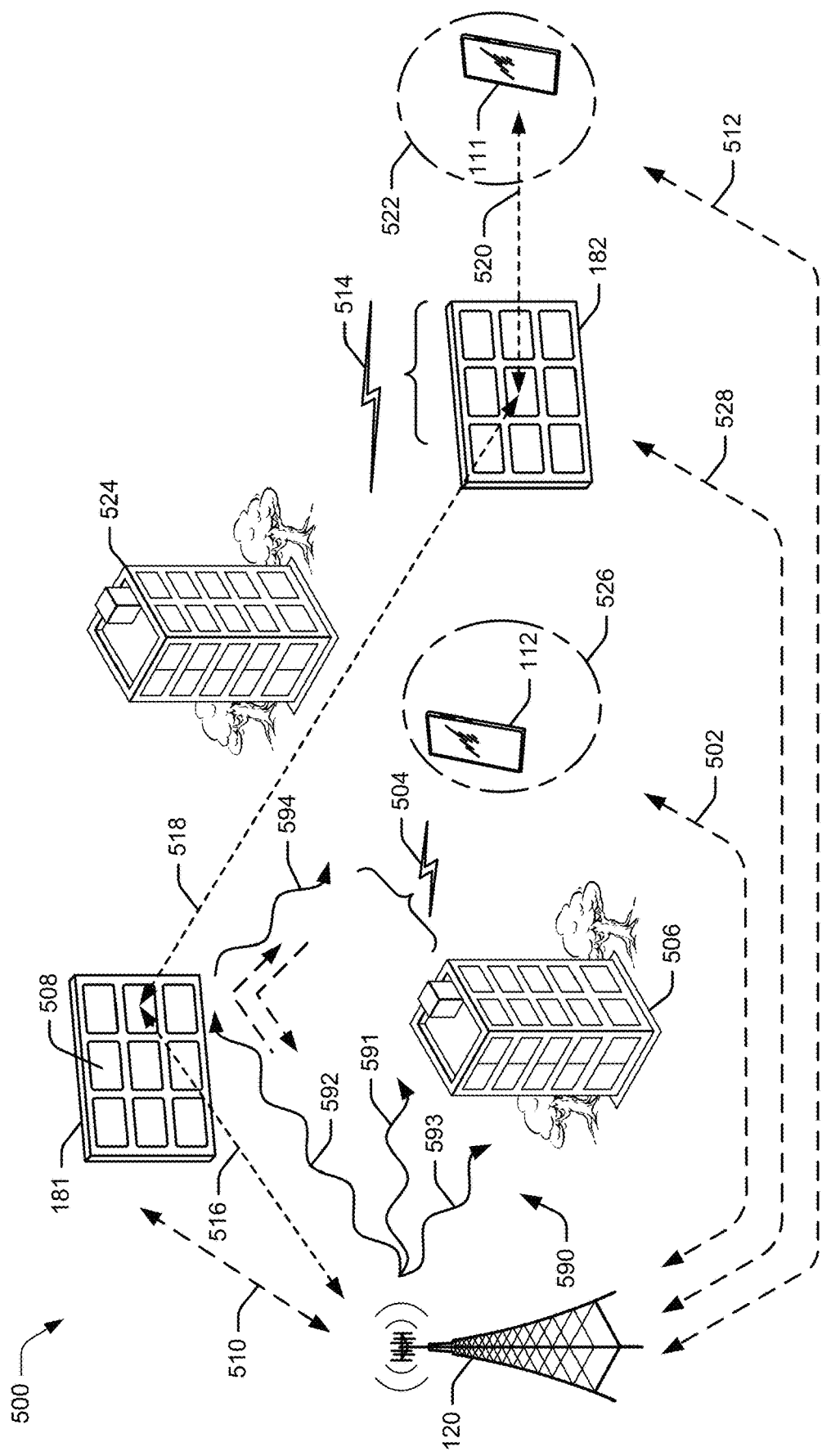
FIG. 5 illustrates an example environment that can be used to implement various aspects of multi-APD communications.

FIG. 5 illustrates an example environment 500 that can be used to implement various aspects of multi-APD communications. The environment 500 includes the base station 120, the APD 181, the APD 182, the UE 111, and the UE 112 of FIG. 1.

As shown in FIG. 5, and in a similar manner to that described with reference to the wireless link 130 of FIG. 1, the base station 120 communicates with the UE 112 using a first low-band wireless link 502 (e.g., below 6 GHz, sub-6 GHz). Alternatively or additionally, the base station 120 communicates with the UE 112 using a first high-band wireless link 504 (e.g., above 6 GHz). In some aspects, the base station and the UE 112 establish the first high-band wireless link 504 by communicating information over the first low-band wireless link 502. For example, the UE 112 communicates UE-location information to the base station 120 over the first low-band wireless link 502 using low-band and/or low-frequency communications that are less susceptible to signal degradation relative to high-band and/or higher-frequency communications. The UE 112 may communicate signal- and/or link-quality parameters (generated from measuring downlink high-band wireless signals such as a channel state information reference signal (CSI-RS) or synchronization signal block(s) (SSBs) to the base station 120 using the first low-band wireless link 502. Alternatively or additionally, the base station 120 generates signal- and/or link-quality parameters by measuring uplink high-band wireless signals from the UE 112 (e.g., by measuring properties of a high-band sounding signal transmitted by the UE 112 such as a sounding reference signal (SRS)). The base station 120 analyzes the UE-location information, signal-quality parameters, and/or link-quality parameters and determines to set up a high-band communication link with the UE 112 and include an APD in the high-band communication path.

In response to determining to include an APD in the high-band communication path, the base station 120 selects the APD 181 based on any combination of information, such as by monitoring for an APD-broadcast signal and/or message that announces a presence of the APD 181 to the base station 120, accessing APD records that indicate the APDs within a cell service area, and/or querying a server that stores information regarding APDs within the cell service area. The base station 120 may use location information received from the UE 112 over a low-band communication (or obtained using a beam-sweeping procedure) to identify APDs within an operating range of both the base station 120 and the UE 112. In response to selecting the APD 181, the base station 120 configures the APD surface of the APD 181 as further described.

The base station 120 communicates with the UE 112 over the first high-band wireless link 504 by transmitting a wireless signal that includes rays 590 to the UE 112. In the environment 500, the rays 590 could be an omnidirectional wireless signal, but the rays 590 may form a wide beam (as shown) or a narrow beam (e.g., in a direction similar to ray 592). The rays 590, when implementing certain beamwidths, include a first signal ray 591 that propagates towards the UE 112 in an LoS manner, a second signal ray 592 that propagates towards the APD 181, and a third signal ray 593 that propagates towards an obstruction 506 (illustrated as a building) that blocks the signal ray 593 from reaching the UE 112. In other words, the obstruction 506 blocks at least a portion of the wide-beam communication path between the base station 120 and the UE 112.

In aspects, the base station 120 configures the surface of the APD 181 to mitigate signal degradation, such as multipath fading. To illustrate, the UE 112 combines, at a corresponding receiver, the signal ray 591 and signal ray 594. Because the signal rays travel different communication paths, they may arrive at the UE 112 at different times which may result in phase shifts. When combined at the receiver of UE 112, the resultant (combined signal) includes signal degradation from destructive interference. In implementations, the base station 120 configures the surface of the APD 181 to transform a first (incident) signal into a second (reflected) signal with particular properties (e.g., a particular phase shift) that mitigate signal degradation. The base station 120, for example, selects a surface configuration for the APD 181 to transform the signal ray 592 into the signal ray 594 with a phase shift that mitigates destructive interference when combined with the signal ray 191. In other words, the addition of the signal ray 194 to the signal ray 191 at the receiver of the UE 112 improves the (combined) received signal by decreasing destructive interference and/or improving constructive interference caused by combining the multiple signal rays. Thus, processing the combined received signal improves information recovery at the UE 112 by improving the received signal quality.

While the base station 120 transmits the rays 590 to the UE 112, the UE 112 can also communicate with the base station 120 over the first high-band wireless link 504 by transmitting wireless signals towards the base station and/or the APD 181 in a manner reciprocal to the rays 594 and 592 as further described (e.g., the ray 594 originates from the UE 112 and reflects off the surface of the APD 181 to form the ray 592 that propagates towards the base station 120). In aspects, the base station 120 and/or the UE 112 transmit wireless signals towards the surface of the APD 181 in a high-band that is at or above 6 GHz. Individual signal rays 591, 592, and 593 of the signal rays 590 may be transmitted simultaneously or at different times depending on MIMO configurations affecting signal radiation properties such as beamwidth, SU-MIMO configurations, and/or MU-MIMO configurations.

In various implementations, the APD 181 transforms (e.g., reflects) waveforms using an RIS 508 of the APD 181 with a surface configuration determined and/or indicated by the base station 120. To illustrate, the signal ray 592 strikes a portion or all of the surface of the APD 181 and transforms into the signal ray 594 directed toward the UE 112, where the base station 120 selects a surface configuration directed to transforming the signal ray 592 into the signal ray 594. As part of receiving the rays 590, the UE 112 may receive the signal ray 591 and the signal ray 594 (but not the blocked signal ray 593). Alternatively or additionally, the RIS 508 transforms an incident signal ray from the UE 112 on a path reciprocal to signal ray 594 that reflects from the APD 181 and follows a path reciprocal to that of signal ray 592 to the base station 120.

In aspects, the base station 120 selects a surface configuration from a codebook and/or look-up table (LUT) based on any combination of information (e.g., location information, signal-quality measurements, link-quality measurements, historical records) to configure the RIS 508 for high-band wireless communications with the UE 112 as described with reference to FIG. 4. In the environment 500, the base station 120 uses a wireless link 510 to indicate the surface configuration to the APD 181, shown as a low-band wireless link that uses low-band communications (e.g., below 6 GHz, sub-6 GHz) that are less susceptible to signal degradation. Alternatively or additionally, the wireless link 510 includes a high-band wireless link, where the base station 120 transmits high-band signals using an unobstructed LoS communication path to the APD 181. Using the wireless link 510, the base station 120 may transmit an indication of the surface configuration to the APD 181, such as by including an indication of the surface configuration in APD control information and transmitting the APD control information to the APD 181 using an APD-PDCCH and/or an APD-PDSCH as further described with reference to FIG. 4.

In the environment 500, the base station 120 communicates with the UE 111 using a second low-band wireless link 512 and a second high-band wireless link 514, where the base station 120 uses the surface of the APD 181 and the surface of the APD 182 to route high-band (e.g., above 6 GHz) wireless signals to the UE 111. In other words, the base station 120 and the UE 111 exchange multi-APD communications. Alternatively or additionally, the UE 111 uses the surface of the APD 181 and the surface of the APD 182 to route high-band wireless signals to the base station 120 in a reciprocal manner. To illustrate, a, downlink, high-band wireless signal from the base station 120 to the UE 111 may first follow a communication path 516 from the base station 120 towards the surface of the APD 181, strike the surface of the APD 181, reflect, and travel along a communication path 518 towards a surface of the APD 182. Upon striking the surface of the APD 182, the wireless signal travels along a communication path 520 towards the UE 111. In a similar manner, uplink communications from the UE 111 to the base station 120 may follow a reciprocal communication path by traveling the communication path 520, reflecting off the surface of the APD 182, following the communication path 518, reflecting off the surface of the APD 181, and following the communication path 516 towards the base station 120. In aspects, the base station 120 determines when to include APDs to route and/or transform high-band wireless signals to the UE 111. Alternatively or additionally, the base station 120 determines a first surface configuration for the APD 181 and a second surface configuration for the APD 182 to direct or steer the wireless signals in a manner similar to that shown by the communication paths 516, 518, and 520. At times, this may include determining the surface configuration(s) using a beam-sweeping procedure, such as that described with reference to FIG. 7. By virtue of its lower frequency, the second low-band wireless link 512 is less susceptible to signal degradation than the second high-band wireless link 514. As such, the base station 120 can communicate with the UE 111 using the low-band wireless link 512 even when there is no LoS between the base station 120 and the UE 111. Similar to APD wireless link 510, the base station 120 can communicate with the APD 182 using a low-band wireless link 528, even when there is no LoS between the base station 120 and the APD 182 (e.g., due to the presence of an obstruction 506).

The base station 120 may determine to establish multi-APD communications in a variety of ways. To illustrate, assume the base station 120 receives UE-location information, signal-quality parameters, and/or link-quality parameters from the UE 111 over the second low-band wireless link 512, where the UE 111 generates the signal- and/or link-quality parameters by measuring downlink high-band wireless signals such as CSI-RS or SSB. Alternatively or additionally, the base station 120 generates signal- and/or link-quality parameters from uplink high-band wireless signals from the UE 111 such as SRS. Based on analyzing any combination of signal-quality parameters, link-quality parameters, and/or UE-location information, the base station 120 identifies channel impairment(s) and/or determines to use any number (0, 1, 2, or more) APD surfaces to transmit a wireless signal to the UE 111.

As one example of a multi-APD communication, assume the UE 111 establishes the second low-band wireless link 512 with the base station 120 and attempts to establish the high-band wireless link 514 while operating at location 522. In some aspects, the UE 111 transmits UE-location information to the base station 120 using the second low-band wireless link 512, and the base station 120 determines, from historical records, that past communications with other UEs at the UE location (e.g., the location 522) used multi-APDs (e.g., the APD 181 and the APD 182 as identified through their respective APD-RNTIs) to route wireless signals to/from the UEs. The base station may also obtain, from the historical records, surface configurations (e.g., a first downlink surface configuration for the APD 181, a first uplink surface configuration for the APD 181, a second downlink configuration for the APD 182, a second uplink configuration for the APD 182) that correlate to successful communications between the BS 120 and UEs at the location 522. Alternatively or additionally, the base station 120 determines the surface configurations using one or more beam-sweeping procedures as further described.

As a second example, assume the base station 120 and the UE 111 (operating at the location 522) attempt to establish the second high-band wireless link 514 without the use of an APD surface and the base station 120 identifies a channel impairment (e.g., LoS impairment) by analyzing signal- and/or link-quality measurements. The base station may first determine to establish the second high-band wireless link 514 using single-APD wireless communications (e.g., routing the wireless communications using the APD1 or the APD2 but not both APDs) and, if the single-APD wireless communications fail, determine to establish the second high-band wireless link 514 using multi-APD wireless communications (e.g., routing the wireless communications using both the APD1 and the APD2). For instance, the base station 120 attempts to establish the second high-band wireless link 514 using the APD 181 (without using the APD 182) in a manner similar to that described with reference to establishing the first high-band wireless link 504 with the UE 112. Alternatively or additionally, the base station 120 attempts to establish the second high-band wireless link 514 using single-hopped wireless communications and the surface of the APD 182 (without using the APD 181). However, as shown in the environment 500, an obstruction 524 blocks LoS communications between the APD 181 and the UE 111 (at the location 522), thus preventing single-APD communications using the APD 181. Similarly, the obstruction 506 blocks LoS communications between the base station 120 and the APD 182. Because the obstructions 524 and 506 block LoS communications, the base station 120 again identifies channel impairments (this time associated with single-APD wireless communications) and determines to establish the second high-band wireless link 514 using multi-APD communications and at least two APDs. The base station may select the APDs using any combination of information as further described. Further, while the environment 500 illustrates multi-APD wireless communications using two APDs, additional APDs may be incorporated into the communication channel.

As a third example, the base station incrementally adds APDs to the communication path as conditions change. To illustrate, assume the base station 120 and UE 112 establish the first low-band wireless link 502 and the first high-band wireless link 504 while the UE 112 operates at location 526 as further described. As the UE 112 travels away from the location 526 towards the location 522, the base station 120 monitors signal- and/or link-quality parameters from the UE 112 and identifies when a channel impairment occurs, such as a channel impairment caused by obstruction 524 blocking an LoS communication path between the APD 181 and the UE 112. In response to identifying channel impairment(s), the base station 120 determines to include at least a second APD surface in the communication path with the UE to route and/or transform wireless signals for the first high-band wireless link 504.

Alternatively or additionally, as the UE 112 moves away from the location 526 and towards the location 522, the UE 112 may repeatedly indicate (updated) location information to the base station 120, either using the first low-band wireless link 502 or the first high-band wireless link 504. By analyzing the (updated) location information, the base station 120 identifies when the UE 112 moves to a location where (historically) high-band communications improve using multi-APD communications. The historical records of channel impairment and/or related UE location created as part of this third example may be used to set up APD-assisted wireless communications channels for future UEs located or moving along this path (or its reciprocal moving from location 522 to location 526).

In aspects, the base station 120 determines surface configurations for the APD 181 and the APD 182. To illustrate, the base station selects a first set of surface configurations for downlink communications (e.g., a first downlink surface configuration for the APD 181 that reflects signals from the APD 181 towards the APD 182 along the communication path 518, and/or a second downlink configuration for the APD 182 that reflects signals from the APD 182 towards the UE 111 along the communication path 520). Alternatively or additionally, the base station selects a second set of surface configurations for uplink communications (e.g., a first uplink configuration for the APD 182 that reflects signals from the UE 111 towards the APD 181 along the communication path 518, and/or a second uplink configuration for the APD 181 that reflects signals from the APD 181 towards the base station 120 along the communication path 516). The base station 120 may select the surface configurations using historical records and/or by initiating a beam-sweeping procedure, such as that described with reference to FIG. 7.

As one example, assume the base station 120, the APD 181, and the APD 182 reside at fixed locations. Based on the fixed locations, the communication path 516 (and 592) and the communication path 518 generally remain constant (assuming no obstructions move into the paths). The fixed locations allow the base station 120 to select a static and/or a previously utilized surface configuration for the APD 181 that redirects downlink signals from the base station 120 (along the communication path 516) to the APD 182 (along the communication path 518), and in a reciprocal manner for uplink signals. However, because the UE 111 may have high mobility, the base station 120 initiates a beam-sweeping procedure by directing the APD 181 to maintain the current surface configuration (e.g., the static/previously utilized surface configuration associated with the fixed locations) and directing the APD 182 to apply a beam-sweeping pattern to the APD surface, such as by indicating an index value that maps to an entry in a beam-sweeping codebook or to a timed sequence of entries in a surface-configuration codebook such as codebook 408. Generally, a beam-sweeping pattern corresponds to an order of surface configurations (and optionally APD reflection identifiers) that an APD cycles through (e.g., applies each surface configuration in succession based on timing information) to beam-sweep (reflected) signals in a horizontal direction and/or vertical direction. The beam-sweeping pattern may also indicate a time duration for applying each surface configuration and/or a position adjustment that moves the APD 182.

During a single-APD beam-sweeping procedure, the base station 120 transmits a downlink signal (e.g., a downlink reference signal such as CSI-RS or SSB) while the APD 182 cycles through the surface configurations, and the UE 111 returns measurements, which may or may not include a beam identifier indicating the transmitted beam and individual APD reflection beams. Alternatively or additionally, the UE 111 transmits an uplink signal (e.g., a sounding signal such as sounding reference signal (SRS)) during the APD 182 beam-sweeping procedure, and the base station 120 generates measurements of APD-reflected or LoS received signals.

The base station analyzes any combination of measurements to select surface configuration(s) for the APD 182 that improves downlink signal-reception at the UE 111 and/or uplink signal-reception at the base station 120. This may include selecting the first surface configuration that meets an acceptable received signal level (and terminating the beam-sweeping procedure to save time) or selecting a surface configuration associated with the best measurements out of a complete set of measurements.

As another example, when a single-APD path has a received signal strength/quality below a threshold (or below one or more respective thresholds), the base station 120 initiates a beam-sweeping procedure in which both APDs apply (respective) beam-sweeping patterns in a coordinated and iterative manner. In other words, the APD 181 and the APD 182 apply the (respective) beam-sweeping patterns by cycling through different combinations of surface configurations at the APDs (e.g., the surface configuration pairs). For instance, assume the APD 181 and/or the APD 182 correspond to movable APDs that have variable locations and/or positions. In aspects, the base station 120 determines the surface configurations by directing each APD to apply a respective beam-sweeping pattern. To illustrate, the base station 120 directs the APD 181 to apply a first beam-sweeping pattern and directs the APD 182 to apply a second beam-sweeping pattern in a time-coordinated fashion with the first beam-sweeping pattern. During the multi-APD beam-sweeping procedure, the base station 120 transmits a consistent downlink reference signal while the APDs cycle through the surface configurations. For instance, the APD 181 applies a first surface configuration of the first beam-sweeping pattern and maintains the first surface configuration while the APD 182 cycles through the set of surface configurations associated with the second beam-sweeping pattern. The UE 111 measures the received signals and returns the measurements to the base station 120.

Proceeding with the multi-APD beam-sweeping procedure, the APD 181 then applies a second surface configuration of the first beam-sweeping pattern and maintains the second surface configuration while the APD 182 (re)cycles through the set of surface configurations associated with the second beam-sweeping pattern and the UE 111 returns measurements to the base station 120. This process may iteratively repeat. The base station 120 analyzes the received signal measurements from the UE (e.g., provided on via 512) and, in some aspects, selects the first surface configuration pair (e.g., a pair of surface configurations for the APD 181 and the APD 182 that successfully route and/or transform wireless signals) that meets an acceptable performance threshold, thus allowing the base station 120 to terminate the beam-sweeping procedure for time-saving purposes. Alternatively, the base station 120 completes the full multi-APD beam-sweeping cycle and selects the surface configuration pair with the best received signal-quality out of the set of configuration pairs.

In some aspects, the UE 111 transmits an uplink signal (e.g., a sounding reference signal (SRS)) while the APD 181 and the APD 182 cycle through surface configurations, and the base station generates signal- and/or link-quality measurements based on the uplink transmissions in a manner similar to the downlink multi-APD beam-sweeping procedure.

Modifying a surface configuration of the RIS changes how signals are transformed when they reflect off an RIS of an APD, such as by generating a reflected signal that helps decrease destructive interference and/or improve constructive interference when a receiver combines the reflected signal with other signals. Alternatively or additionally, the configuration of RIS redirects the reflective signals around LoS obstructions as further described. Thus, multi-APD wireless communications allow a wireless system to extend a high-band (e.g., above 6 GHz) coverage area (relative to single-hop or no-hop communications) by mitigating conditions that might otherwise cause recovery errors at a receiver. This also improve data rates, data throughput, and reliability in a wireless network.

Signaling and Control Transactions for Multi-APD Communications

Figure 6:
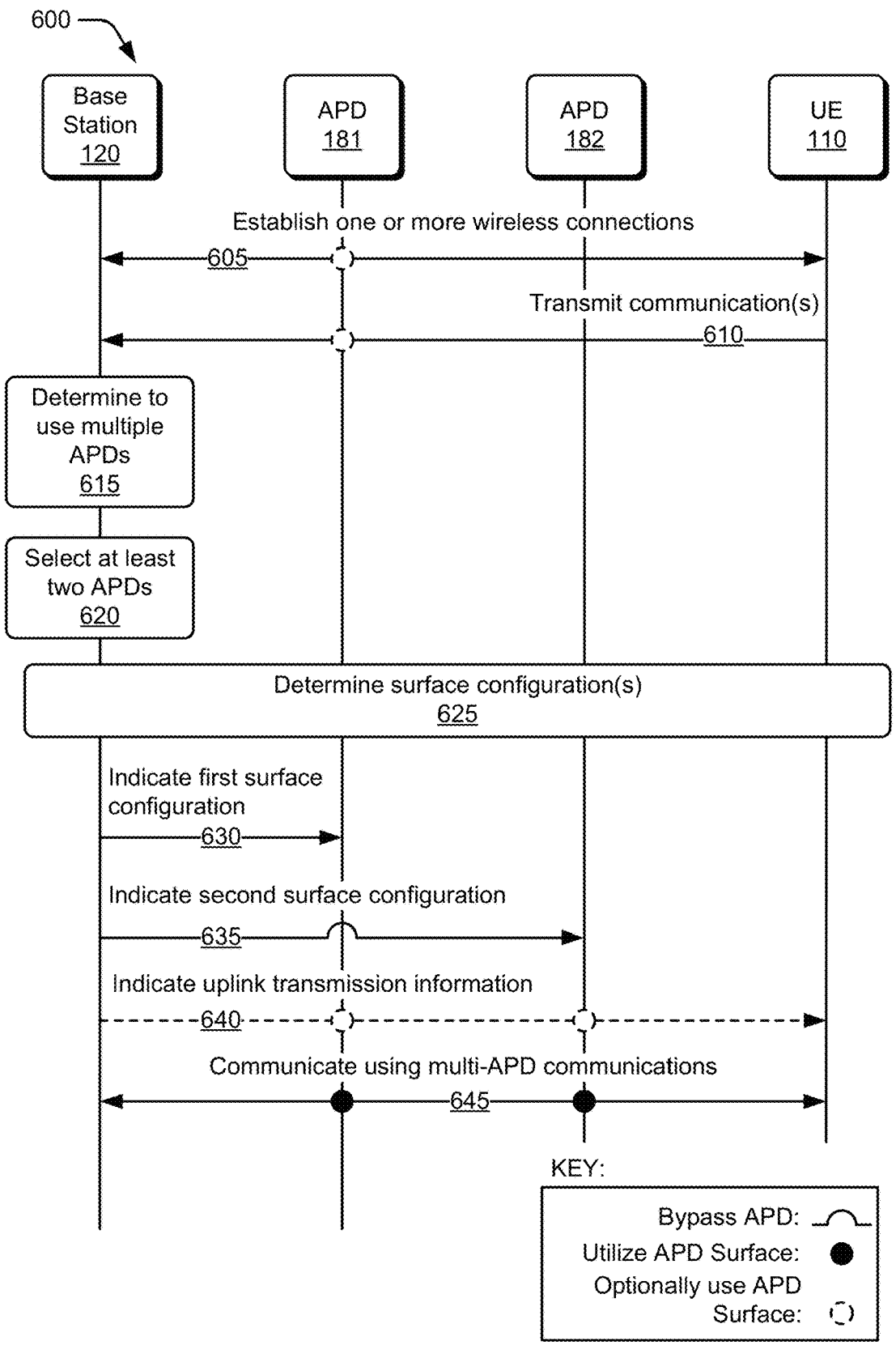
FIG. 6 illustrates an example transaction diagram between various network entities in accordance with various aspects of multi-APD communications.
Figure 7:
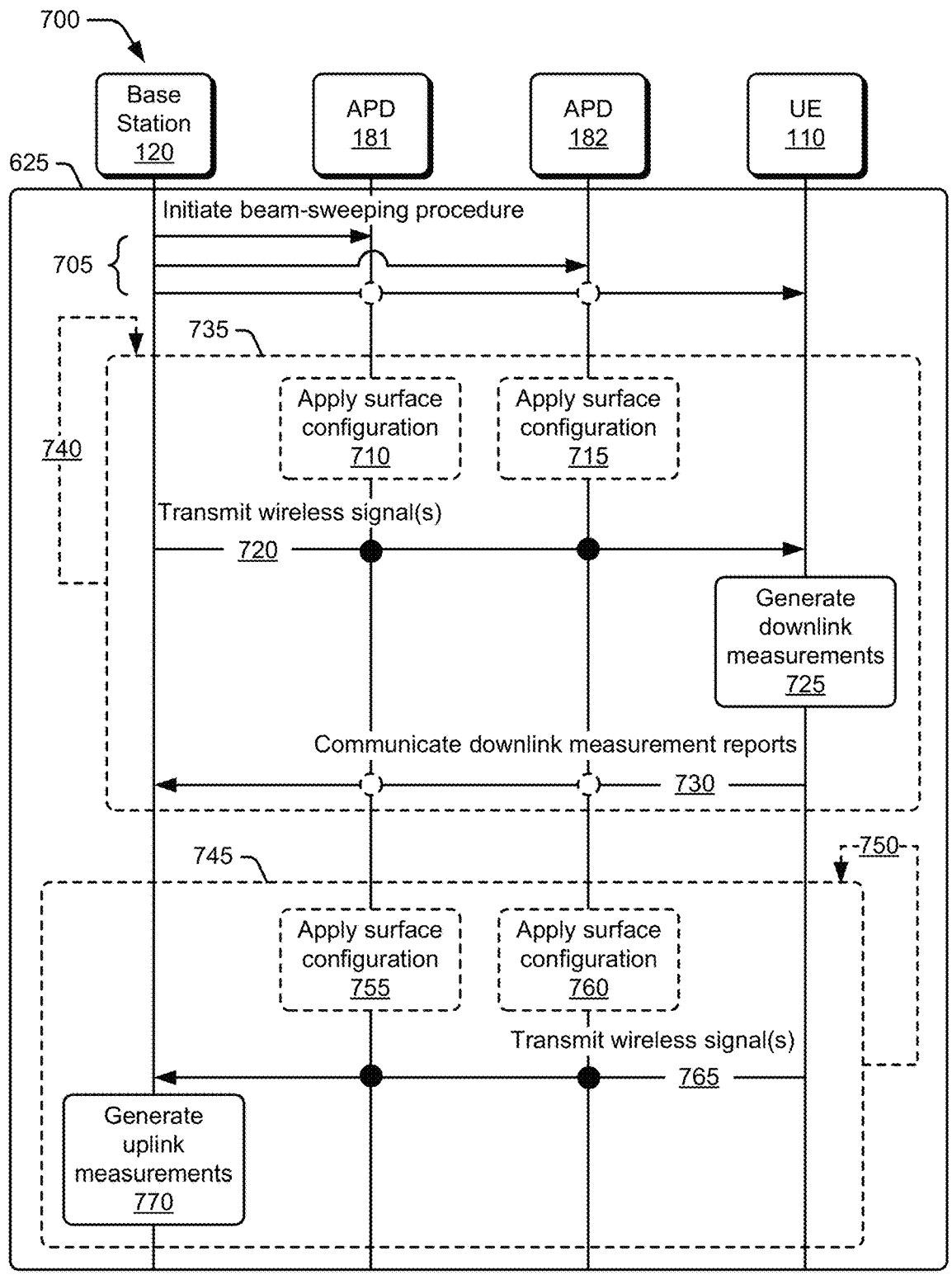
FIG. 7 illustrates an example transaction diagram between various network entities in accordance with various aspects of multi-APD communications.

FIGS. 6 and 7 illustrate example signaling and control transaction diagrams in accordance with one or more aspects of multi-APD communications. In aspects, the signaling and control transactions may be performed by any combination of devices, including at least a base station (e.g., the base station 120), a first APD (e.g., the APD 181), a second APD (e.g., the APD 182), and a UE (e.g., the UE 110). The example signaling and control transactions may be implemented using aspects as described with reference to any of FIGS. 1-5.

FIG. 6 illustrates a first example of signaling and control transactions for multi-APD communications. A signaling and control transaction diagram 600 includes signaling and control transactions among the base station 120, the APD 181, the APD 182, and the UE 110 of FIG. 1.

At 605, the base station 120 and the UE 110 establish one or more wireless connections, which may optionally include using the surface of a first APD (e.g., the APD 181). For instance, as described with reference to FIG. 5, the base station 120 establishes a low-band wireless link (e.g., the first low-band wireless link 502, the second low-band wireless link 512), where the devices do not (intentionally) use the surface of the APD 181 to reflect and/or redirect wireless signals. Alternatively or additionally, the base station 120 establishes a single-hopped high-band wireless link (e.g., the first high-band wireless link 504) with the UE 110 that utilizes the surface of the APD 181. In some aspects, the base station 120 unsuccessfully attempts to establish the high-band wireless link. For instance, the base station 120 attempts to establish the high-band wireless link with the UE 110, but obstructions (e.g., the obstruction 506, the obstruction 524) block an LoS communication path, thus causing signal failure.

At 610, the UE 110 transmits one or more uplink communications to the base station 120, which may optionally include using the surface of the APD 181. For instance, the UE 110 transmits UE-location information using the low-band wireless link (e.g., without using the APD surface) and/or using a single-hopped high-band wireless link (e.g., using the APD surface). In some aspects, the UE 110 transmits signal- and/or link-quality measurements to the base station 120 using either the low-band wireless communication link or the single-hopped high-band wireless link, where UE 110 generates the signal- and/or link-quality measurements by measuring received high-band (e.g., above 6 GHz) wireless signals from the BS such as CSI-RS or SSB. The UE 110 may iteratively transmit the UE-location information, the signal-quality measurements, and/or link-quality measurements.

At 615, the base station 120 determines to use multiple APDs to reflect high-band wireless signals that implement a high-band wireless link as described with reference to FIG. 5. For instance, the base station 120 analyzes the signal- and/or link-quality measurements and detects a channel impairment or detects that the signal- and/or link-quality measurements are trending to fall below an acceptable performance level. As another example, the base station 120 analyzes historical records using the UE-location information and identifies that the UE location is historically associated with multi-APD (high-band) wireless communications or that the UE 110 is moving towards a location historically associated with multi-APD communications.

At 620, the base station 120 selects at least two APDs (e.g., the APD 181, the APD 182) to use in a communication path. For instance, the base station 120 monitors for one or more APD-broadcast signals from the APDs, accesses APD records that indicate APDs within a cell service area, queries a server that stores APD information, uses UE-location information to identify APDs within operating range of the UE 110, and so forth.

At 625, the base station 120 determines surface configurations for the APD 181 and the APD 182. As one example, the base station 120 determines to use a static and/or previously successful surface configuration for the APD 181, as described with reference to FIG. 5, and initiates a beam-sweeping procedure to determine a second surface configuration for the APD 182 as described with reference to FIG. 7. Alternatively, the base station 120 uses a multi-APD beam-sweeping procedure to determine at least first and second surface configurations for the APDs 181 and 182. In aspects, the base station 120 initiates the beam-sweeping procedure by transmitting a command to the APD 181 using the APD-PDCCH, the APD-PDSCH, and/or an APD-RNTI assigned to the APD 181. Similarly, the base station 120 initiates the beam-sweeping procedure at the APD 182 by transmitting a command to the APD 182 using the APD-PDCCH, APD-PDSCH, and/or an APD-RNTI assigned to the APD 182.

As part of determining the surface configuration at 625, the base station 120 may initiate a beam-sweeping procedure, such as the beam-sweeping procedure described with reference to FIG. 7. As one example, the base station 120 transmits a downlink, high-band wireless signal towards a surface of the APD 181, the APD 181 maintains a first surface configuration, the APD 182 cycles through a beam-sweeping pattern, and the UE 110 reports measurements back to the base station 120 (e.g., using a low-band wireless connection 512). As another example, the base station may initiate a beam-sweeping procedure in the APD 181 and the APD 182 apply surface configurations to their respective surfaces in a coordinated and iterative manner as further described. Alternatively or additionally, the base station 120 initiates a beam-sweeping procedure in which the UE 110 transmits an uplink, high-band wireless signal towards the surface of the APD 182, and the base station 120 measures the received uplink, high-band wireless signal. In aspects, the base station 120 determines one or more surface configurations using the downlink measurements, uplink measurements, and/or based on surface configurations applied during the beam-sweeping procedure.

At 630, the base station 120 indicates a first surface configuration (sometimes with timing instructions) to the APD 181, such as by transmitting an indication of the first surface configuration and/or additional APD-specific APD-control information using the APD-PDCCH and an APD-RNTI assigned to the APD 181. Alternatively, the base station 120 indicates, to the APD 181 and using the APD-PDCCH, downlink control information associated with air interface resources of an APD-PDSCH and transmits an indication of the first surface configuration using the indicated air interface resources and the APD-PDSCH. Similarly, at 635, the base station 120 indicates a second surface configuration to the APD 182, such as by transmitting the second surface configuration and/or APD-specific APD-control information using the APD-PDCCH and an APD-RNTI assigned to the APD 182, or using the APD-PDSCH as further described.

At 640, the base station 120 optionally indicates uplink transmission information to the UE 110. As one example, the base station 120 indicates timing information (correlated to when the BS instructions the APD 181 and the APD 182 to apply respective uplink surface configurations) that directs the UE 110 when to transmit uplink wireless signals. In aspects, the base station 120 transmits the uplink transmission information using a low-band wireless link and without using the surfaces of the APD 181 and the APD 182. However, the base station 120 may transmit the uplink transmission information using the high-band wireless link and the surfaces of the APD 181 and the APD 182 as further described. Thus, in indicating the uplink transmission information to the UE 110, the base station 120 optionally uses the surfaces of the APDs to route and/or transform transmissions carrying the uplink APD-configuration information.

At 645, the base station 120 and the UE 110 communicate with one another using multi-APD communications, such as wireless signals used to implement a high-band wireless link. To illustrate, the base station 120 transmits a downlink wireless signal towards a surface of the APD 181. The surface of the APD 181 reflects the downlink wireless signal towards a surface of the APD 182, which reflects the downlink wireless signal towards the UE 110. Alternatively or additionally, the UE 110 transmits uplink wireless signals in a reciprocal manner. In some aspects, the UE 110 analyzes an antenna array configuration used to receive downlink transmissions from the base station 120 (e.g., an antenna array configuration that obtains a peak (received) signal strength or quality) and then uses a reciprocity theorem to configure that antenna array for uplink transmissions to the base station 120.

FIG. 7 illustrates a second example of signaling and control transactions for multi-APD communications. In aspects, FIG. 7 provides details of an implementation of block 625 of FIG. 6 and thus shows the same network elements (the base station 120, the APD 181, the APD 182, and the UE 110). The example signaling and control transactions may be implemented in combination with and/or using aspects as described with reference to any of FIGS. 1-6.

To illustrate, assume that the diagram 700 demonstrates example transactions that can be performed at 625 of FIG. 6. In response to selecting the APD 181 and the APD 182 at block 620 of FIG. 6, the base station 120 determines to initiate a beam-sweeping procedure to select surface configurations for the APDs at block 625 of FIG. 6.

At 705, the base station 120 initiates a beam-sweeping procedure by sending a first command to the APD 181, a second command to the APD 182, and, optionally, a third command to the UE 110. This can include initiating a beam-sweeping procedure in which (i) a first APD maintains a same surface configuration and a second APD applies a set of surface configurations (associated with a beam-sweeping pattern) in succession based on timing information, or (ii) the first APD and the second APD each apply a respective set of surface configurations (associated with respective beam-sweeping patterns and respective timing information) in a coordinated an iterative manner. In some aspects, the base station 120 initiates the beam-sweeping procedure by transmitting the first command to the APD 181 using the APD-PDCCH and/or a UE-specific APD-RNTI assigned to the APD 181 and the second command to the APD 182 using the APD-PDCCH and/or a UE-specific APD-RNTI assigned to the APD 182. The first and second commands may include indications of a surface configuration, phase-sweeping patterns, timing information, and/or APD position information.

The base station 120 directs the UE 110 to participate in the beam-sweeping procedure, such as by directing the UE to monitor and/or measure downlink (high-band) wireless reference signals, extract beam identities from certain received downlink (high-band) wireless signals, transmit measurement reports back to the base station 120, and/or include beam identities in the measurement reports. In some aspects, the base station 120 optionally directs the UE 110 to transmit uplink sounding signals and/or modulate beam identities onto the uplink signals as part of the beam-sweeping procedure.

At 710, the APD 181 applies a first downlink surface configuration, and at 715, the APD 182 applies a second downlink surface configuration, where a downlink surface configuration generally corresponds to a surface configuration associated with directing downlink wireless signals to an intended target device. As one example, assume, at 705, the base station 120 directs the APD 181 to maintain a downlink surface configuration for the duration of the beam-sweeping procedure and directs the APD 182 to apply a set of surface configurations in succession (e.g., a beam-sweeping pattern). At 710, the APD 181 may apply the first downlink surface configuration once and then maintain the first downlink surface configuration for the duration of the beam-sweeping procedure and/or until receiving other directions from the base station 120. At 715, the APD 182 may iteratively apply a set of surface configurations in succession and based on time information in a beam-sweeping pattern, further shown in the diagram 700 at 740.

As another example, at 705, the base station 120 directs the APD 181 to apply a first downlink beam-sweeping pattern and the APD 182 to apply the second downlink beam-sweeping pattern (e.g., beam-sweeping patterns that include downlink RIS configurations). In aspects, the APD 181 cycles through a first set of surface configurations associated with the first downlink beam-sweeping pattern and the APD 182 cycles through the second set of surface configurations in a coordinated and iterative manner to cycle through the different combinations of surface configuration pairs. This may include the base station 120 directing the APD 181 and/or the APD 182 to perform a full beam-sweeping procedure that sweeps through all surface configurations in a set of surface configurations (e.g., a set of surface configuration that covers a full range of predetermined reflection angles) or a partial beam-sweeping procedure that sweeps through a subset of surface configurations in the set of surface configurations.

To illustrate, the base station 120 may direct the APD 181 and/or the APD 182 to use partial beam-sweeping patterns or broad beam-sweeping patterns. As one example, the base station 120 may direct the APD 182 to use a broad beam-sweeping pattern in which the APD 182 applies a sequence of surface configurations that correspond to a broad beam-sweeping pattern of over 90 degrees and perhaps to almost 180 degrees. The broad beam-sweeping pattern configures the RIS to reflect an incident beam such that the reflected beam incrementally spans or sweeps a spatial region broadly (e.g., sweeping 150 degrees to 30 degrees in 5 degree steps over the duration of the beam-sweeping procedure). In other words, the sequence of surface configurations corresponds to a set of phase vectors in a surface-configuration codebook, where each phase vector corresponds to a respective reflection angle. Alternatively or additionally, the base station 120 directs the APD 181 to use a partial beam-sweeping pattern in which the APD 182 applies a subset of surface configurations such that the (resultant) partial beam-sweeping pattern configures the RIS to sweep the reflected beam incrementally over a smaller spatial region (e.g., approximately 90 degrees to 60 degrees in 5 degree steps). While described as sweeping through a sequence of surface configurations, the beam-sweeping patterns can alternatively or additionally sweep through a sequence of APD/APD surface positions (e.g., azimuth positioning, elevation positioning). In performing the beam-sweeping procedure, the APD 181 applies and maintains a first surface configuration of a first downlink beam-sweeping pattern at 710 while the APD 182 cycles through the surface configurations defined by a second beam-sweeping pattern at 715. As the beam-sweeping procedure progresses as shown by block 740, the APD 181 iterates through the first downlink beam-sweeping pattern by applying and maintaining a second surface configuration of the first downlink beam-sweeping pattern at 710 while the APD 182 (re)cycles through the surface configurations defined by the second downlink beam-sweeping pattern at 715. Accordingly, at 710 and at 715, the APD 181 and the APD 182 may apply respective next surface configurations at different times from one another.

At 720, the base station 120 transmits one or more downlink wireless signals towards a surface of the APD 181, which strike the surface of the APD 181 and, depending upon a current surface configuration of the APD 181, may reflect towards the surface of the APD 182. Similarly, the reflected downlink wireless signal(s) may strike the surface of the APD 182 and, depending upon a current surface configuration of the APD 182, may reflect towards the UE 110.

At 725, the UE generates downlink measurements on the downlink wireless signal(s), which may include extracting beam-identifier information from the received downlink wireless signal. As one example, the UE generates an RSRP measurement using the received downlink wireless signal.

At 730, the UE 110 communicates one or more downlink measurement reports to the base station. Alternatively or additionally, the UE 110 includes a beam identifier in the measurement report. In communicating the downlink measurement report(s) to the base station 120, the UE 110 may use a low-band wireless link without (intentionally) using the surfaces of the APD 181 and the APD 182. Alternatively, the UE 110 transmits the measurement reports using the surfaces of the APD 181 and APD 182. The UE may report measurements at every interval that reflects a change in either of the surface configurations 715 or may batch-report received signal measurements on a less-frequent basis. Examples include sending received signal measurements when the measurements exceed a threshold, after a cycle is completed (e.g., sweeping pattern 715 is completed), or after completing multiple cycles.

Sub-diagram 735 includes a first set of signaling and control transactions that corresponds to a downlink beam-sweeping procedure in which the base station 120 transmits downlink wireless signals that are (potentially) reflected off the surfaces of the APD 181 and/or APD 182 and measured by the UE 110. As indicated at 740, the first set of signaling and control transactions included in the sub-diagram 735 may iteratively repeat based on one or more beam-sweeping patterns to cycle through surface configuration pairs as further described. The sub-diagram 735 may optionally be included in the beam-sweeping procedure. To illustrate, in some aspects, the base station 120 determines to perform only an uplink beam-sweeping procedure to select uplink surface configurations for uplink multi-APD communications and determines to exclude the first set of signaling and control transactions included in the sub-diagram 735 for time-saving purposes.

Sub-diagram 745 includes a second set of signaling and control transactions that corresponds to an uplink beam-sweeping procedure in which the UE 110 transmits uplink wireless signals that (potentially) reflect off the surfaces of the APD 182 and/or APD 181, which the base station 120 measures. As indicated at 750, the second set of signaling and control transactions included in the sub-diagram 745 may iteratively repeat to cycle through surface configuration pairs based on one or more beam-sweeping patterns. The sub-diagram 745 may optionally be included in the beam-sweeping procedure as part of block 625. To illustrate, in some aspects, the base station 120 determines to perform only a downlink beam-sweeping procedure at block 735 to select downlink surface configurations for downlink multi-APD communications and determines to use the reciprocity theorem and exclude the second set of signaling and control transactions included in the sub-diagram 745 for time-saving purposes.

At 755, the APD 181 applies a first uplink surface-configuration, and at 760, the APD 182 applies a second uplink surface-configuration, where an uplink surface configuration generally corresponds to a surface configuration associated with directing uplink wireless signals to an intended target device. Similar to that described with reference to the sub-diagram 735, this can include a first APD maintaining a surface configuration while a second APD cycles through a first uplink beam-sweeping pattern (e.g., beam-sweeping patterns that include multiple uplink surface configurations), or each APD cycling through a respective uplink beam-sweeping pattern in a coordinated and iterative manner.

At 765, the UE 110 transmits one or more uplink wireless signals (e.g., an SRS). Alternatively or additionally, the UE 110 modulates a beam identity on the uplink wireless signals in a manner similar to that described with reference to the base station 120. To illustrate, the UE 110 transmits one or more uplink wireless signals, some rays of which strike the surface of the APD 182 and, depending upon a current surface configuration of the APD 182, may reflect towards the surface of the APD 181. Similarly, the reflected uplink wireless signal(s) may strike the surface of the APD 181 and, depending upon a current surface configuration of the APD 181, may reflect towards the base station 120.

At 770, the base station generates uplink measurements based on the uplink wireless signals received from the UE 110. In aspects, the base station 120 then uses any combination of the downlink measurement reports and/or the uplink measurement reports (e.g., at 625 of FIG. 6) to select a surface configuration pair (e.g., from the beam-sweeping pattern(s)) for the APDs that route and/or transform wireless signals between the base station 120 and UE 110.

Example Methods for Multi-APD Communications

Figure 8:
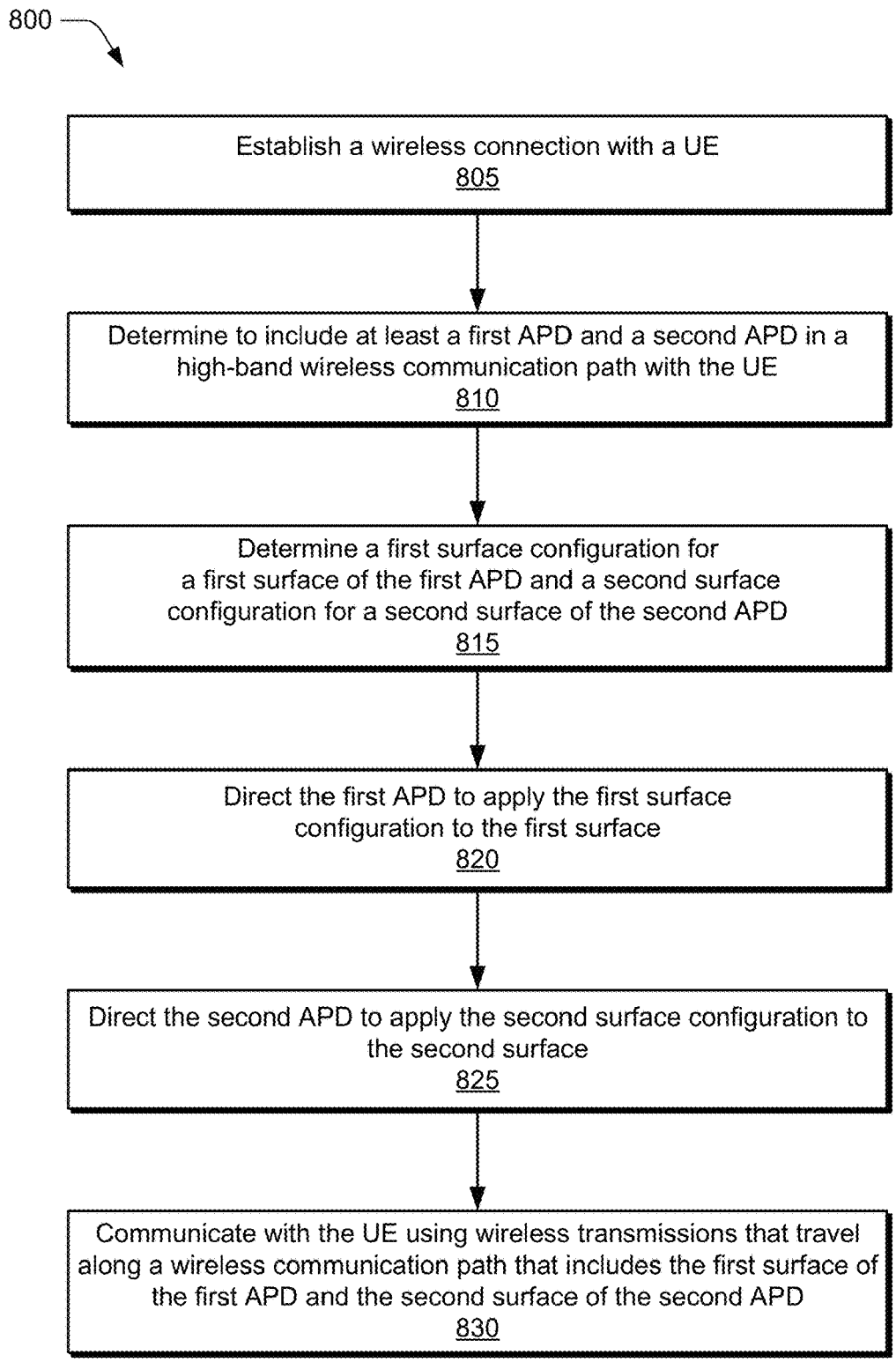
FIG. 8 illustrates an example method in accordance with various aspects of multi-APD communications.

Example method 800 is described with reference to FIG. 8 in accordance with one or more aspects of multi-APD communications. The example method 800 used to perform aspects of multi-APD communications may be performed by a base station, such as the base station 120 of FIG. 1.

At 805, a base station establishes a wireless connection with a UE. To illustrate, the base station 120 establishes a low-band wireless link (e.g., the first low-band wireless link 502, the second low-band wireless link 512) with the UE 110 as described at 605 of FIG. 6 and further described with reference to FIG. 5. Alternatively or additionally, the base station establishes (and/or attempts to establish) a high-band wireless link (e.g., the first high-band wireless link 504) with the UE 110.

At 810, the base station determines, based on the wireless connection, to include at least a first APD and a second APD in a high-band wireless communication path with the UE. The base station 120, for instance, determines to include the APD 181 and the APD 182 in a high-band communication path with the UE 110 as described at 615 of FIG. 6 and further described with reference to FIG. 5.

At 815, the base station determines a first surface configuration for a first surface of the first APD and a second surface configuration for a second surface of the second APD. For example, the base station initiates a beam-sweeping procedure as described at 705 of FIG. 7, receives downlink measurement reports from the UE 110 as described at 730 of FIG. 7, and/or generates uplink measurements as described at 770 of FIG. 7. In aspects, the base station 120 uses the downlink and/or uplink measurements to select a surface configuration pair for the APD 181 and the APD 182 as described at 625 of FIG. 6.

At 820, the base station directs the first APD to apply the first surface configuration to the first surface. To illustrate, the base station 120 transmits an indication of the first surface configuration to the APD 181 over an APD-PDCCH and/or using an APD-RNTI assigned to the APD 181. Alternatively or additionally, the base station 120 transmits an indication of the first surface configuration over an APD-PDSCH and an APD identity assigned to the APD 181.

At 825, the base station directs the second APD to apply the second surface configuration to the second surface. To illustrate, the base station 120 transmits an indication of the second surface configuration to the APD 182 over the APD-PDCCH and/or using an APD-RNTI assigned to the APD 182. In aspects, the base station 120 transmits an indication of the second surface configuration using an APD-PDSCH and an APD identity assigned to the APD 182.

At 830, the base station communicates with the UE using wireless transmissions that travel along a wireless communication path that includes the first surface of the first APD and the second surface of the second APD. For instance, as described at 645 of FIG. 6 and further described with reference to FIG. 5, the base station 120 transmits downlink wireless signals towards a surface of the APD 181 (e.g., along the communication path 516) that, upon striking the surface of the APD 181, reflect towards the surface of the APD 182 (e.g., along the communication path 518). Upon striking the surface of the APD 182, the downlink wireless signals propagate towards the UE 110 (e.g., along the communication path 520). In aspects, uplink wireless signals transmitted by the UE 110 propagate along a reciprocal path.

The order in which the method blocks of the method 800 is described is not intended to be construed as a limitation, and any number of the described method blocks can be skipped or combined in any order to implement a method or an alternative method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or additionally, any of the functionality described herein can be performed, at least in part, by one or more hardware logic components, such as, and without limitation, Field-Programmable Gate Arrays (FPGAs), Application-Specific Integrated Circuits (ASICs), Application-Specific Standard Products (ASSPs), System-on-Chip systems (SoCs), Complex Programmable Logic Devices (CPLDs), and the like.

Although aspects of multi-APD communications have been described in language specific to features and/or methods, the subject of the appended claims is not necessarily limited to the specific features or methods described. Rather, the specific features and methods are disclosed as example implementations of multi-APD communications, and other equivalent features and methods are intended to be within the scope of the appended claims. Thus, the appended claims include a list of features that can be selected in "any combination thereof," which includes combining any number and any combination of the listed features. Further, various different aspects are described, and it is to be appreciated that each described aspect can be implemented independently or in connection with one or more other described aspects.

In the following, several examples are described:

Example 1: A method performed by a base station for communicating with a user equipment, UE, using multiple adaptive phase-changing devices, APDs, the method comprising: establishing a wireless connection with the UE; determining, based on the wireless connection, to include at least a first adaptive phase-changing device, APD, and a second APD in a wireless communication path with the UE; determining a first surface configuration for a first surface of the first APD and a second surface configuration for a second surface of the second APD; directing the first APD to apply the first surface configuration to the first surface based on first timing information; directing the second APD to apply the second surface configuration to the second surface based on second timing information; and communicating with the UE using wireless transmissions that travel along the wireless communication path that includes the first surface of the first APD and the second surface of the second APD.

Example 2: The method as recited in example 1, wherein establishing the wireless connection with the UE comprises: establishing the wireless connection with the UE without using the first surface of the first APD and the second surface of the second APD; or establishing the wireless connection with the UE using a single APD surface, the single APD being the first APD.

Example 3: The method as recited in example 2, wherein establishing the wireless connection with the UE further comprises: establishing, with the UE and as the wireless connection, a first wireless connection using wireless transmissions in a first frequency band below 6 gigahertz, GHz, and without using the first surface of the first APD and the second surface of the second APD, and wherein determining to include at least the first APD and the second APD in the wireless communication path with the UE further comprises: determining to establish, with the UE, a second wireless connection that uses wireless transmissions in a second frequency band above 6 GHz; determining UE-location information from the UE using the first wireless connection; and based on the UE-location information, determining to use the first APD and the second APD in the wireless communication path for the wireless transmissions in the second frequency band.

Example 4: The method as recited in example 2, wherein establishing the wireless connection with the UE comprises: establishing, with the UE and as the wireless connection, a wireless connection that uses wireless transmissions in a second frequency band above 6 gigahertz, GHz, and the single APD surface, and wherein determining to include at least the first APD and the second APD in the wireless communication path with the UE comprises: obtaining signal-quality or link-quality parameters associated with the wireless transmissions in the second frequency band; identifying a channel impairment in the wireless connection that uses the wireless transmissions in the second frequency band the band by analyzing the signal-quality or link-quality parameters associated with the wireless transmissions in the second frequency band; and responsive to identifying the channel impairment, determining to add the second APD to the wireless communication path.

Example 5: The method as recited in any one of examples 1 to 4, wherein determining the first surface configuration and the second surface configuration further comprises: initiating a beam-sweeping procedure using the first APD and the second APD; obtaining signal-quality or link-quality parameters associated with the beam-sweeping procedure; and selecting the first surface configuration and the second surface configuration by analyzing the signal-quality or link-quality parameters associated with the beam-sweeping procedure.

Example 6: The example as recited in example 5, wherein initiating the beam-sweeping procedure further comprises: transmitting a downlink reference signal as part of the beam-sweeping procedure.

Example 7: The example as recited in example 6, wherein transmitting the downlink reference signal further comprises: transmitting one of: a channel state information reference signal, CSI-RS, or one or more synchronization signal blocks, SSBs.

Example 8: The method as recited in any one of examples 5 to 7, wherein obtaining the signal-quality or link-quality parameters associated with the beam-sweeping procedure further comprises: receiving the signal-quality or link quality parameters from the UE; or generating the signal or link-quality parameters using a sounding reference signal, SRS, received from the UE.

Example 9: The method as recited in example 8, wherein the signal-quality or link quality parameters comprise at least one of: reference signal receive power, RSRP; signal-to-interference-plus-noise ratio, SINR; channel quality indicator, CQI; or channel state information, CSI.

Example 10: The method as recited in any one of examples 5 to 9, wherein initiating the beam-sweeping procedure using the first APD and the second APD further comprising: directing the first APD to perform the beam-sweeping procedure by: apply a first set of phase vectors to the first surface in succession based on time information in a first beam-sweeping pattern; or maintaining an APD-to-APD surface configuration for a duration of the beam-sweeping procedure; and directing the second APD to apply a second set of phase vectors to the second surface in succession based on time information in a second beam-sweeping pattern.

Example 11: The method as recited in any one of examples 1 to 10, wherein determining the first surface configuration for the first surface and the second surface configuration for the second surface further comprises: determining, as the first surface configuration and the second surface configuration, surface configurations for downlink communications to the UE; or determining, as the first surface configuration and the second surface configuration, surface configurations for uplink communications from the UE.

Example 12: The method as recited in any one of examples 1 to 11, further comprising: indicating, as the first time information or the second time information, timing offset information.

Example 13: The method as recited in any one of examples 1 to 12, further comprising: assigning a first adaptive phase-changing device radio-network temporary-identifier, APD_RNTI, to the first APD; assigning a second APD_RNTI to the second APD; communicating first APD control information to the first APD by scrambling the first APD control information with the first APD_RNTI and transmitting the scrambled first APD control information to the first APD using an adaptive phase-changing device physical downlink control channel, APD-PDCCH; and communicating second APD control information to the second APD by scrambling the second APD control information with the second APD_RNTI and transmitting the scrambled second APD control information to the second APD using the APD-PDCCH.

Example 14: The method as recited in any one of examples 1 to 12, further comprising: transmitting first APD control information to the first APD using an adaptive phase-changing device physical downlink shared channel, APD-PDSCH, and a first APD identifier associated with the first APD; and transmitting second APD control information to the second APD using the APD-PDSCH and a second APD identifier associated with the second APD.

Example 15. The method as recited in example 14, further comprising: directing at least the first APD or the second APD to enable a hybrid automatic repeat request, HARQ, process.

Example 16: The method as recited in example 15, further comprising: receiving, from at least the first APD or the second APD, a HARQ acknowledge/negative-acknowledge, ACK/NACK, associated with an APD-PDSCH transmission.

Example 17: A method performed by a base station for communicating with a user equipment, UE, using multiple adaptive phase-changing devices, APDs, the method comprising: communicating with the UE over a wireless communication path that includes a first adaptive phase-changing device, APD; determining to modify the communication path by adding a second APD; determining a first surface configuration for a first surface of the first APD and a second surface configuration for a second surface of the second APD, the surface configurations being configured to cause the first and second APDs to convey communications between the base station and the UE; directing the first APD to apply the first surface configuration to the first surface based on first timing information; directing the second APD to apply the second surface configuration to the second surface based on second timing information; and communicating with the UE using a wireless communication path that includes the first APD and the second APD.

Example 18: The method as recited in example 17, further comprising: determining to modify the communication path by adding a third APD; determining a new surface configuration for at least one of the first and second APDs, and determining a third configuration for a third surface of the third APD, the surface configurations collectively being configured to cause the first, second and third APDs to convey communications between the base station and the UE; directing the at least one of the first and second APDs to apply the new surface configuration; directing the third APD to apply the third surface configuration to the third surface; and communicating with the UE using a wireless communication path that includes the first, second and third APDs.

Example 19: The method as recited in example 17, further comprising: determining to modify the communication path by substituting the second APD for a third APD; determining a new surface configuration for the first surface of the first APD, and determining a third configuration for a third surface of the third APD, the surface configurations collectively being configured to cause the first and third APDs to convey communications between the base station and the UE without using the second APD; directing the first APD to apply the new surface configuration to the first surface; directing the third APD to apply the third surface configuration to the third surface; and communicating with the UE using a wireless communication path that includes the first and third APDs but not the second APD.

Example 20: The method as recited in example 17, further comprising: determining to modify the communication path by removing the second APD; determining a new surface configuration for the first surface of the first APD, the new surface configuration being configured to cause the first APD to convey communications between the base station and the UE without using the second APD; directing the first APD to apply the new surface configuration to the first surface; and communicating with the UE using a wireless communication path that includes the first APD but not the second APD.

Example 21: The method as recited in any of examples 17 to 20, wherein determining to modify the communication path is performed in response to detecting a channel impairment in the communication path.

Example 22: The method as recited in any of examples 17 to 21, further comprising any of the features recited in any of examples 5 to 16.

Example 23: A base station comprising: a processor; and computer-readable storage media comprising instructions, responsive to execution by the processor, for directing the base station to perform a method as recited in any one of examples 1 to 22.

Example 24: A computer-readable storage media comprising instructions that, responsive to execution by a processor, direct a base station to perform a method as recited in any one of examples 1 to 22

What is claimed is:

1. A method performed by a base station for communicating with a user equipment (UE) using multiple adaptive phase-changing devices (APDs) the method comprising:
    establishing a wireless connection with the UE;
    determining, based on the wireless connection, to include at least a first adaptive phase-changing device (APD) and a second APD in a wireless communication path with the UE;
    determining a first surface configuration for a first surface of the first APD and a second surface configuration for a second surface of the second APD;
    transmitting an indication of the first surface configuration to the first APD over an APD physical downlink control channel (APD-PDCCH) to dynamically configure the first APD on a slot-by-slot basis by directing the first APD to apply the first surface configuration to the first surface based on first timing information;
    directing the second APD to apply the second surface configuration to the second surface based on second timing information; and
    communicating with the UE using wireless transmissions that travel along the wireless communication path that includes the first surface of the first APD and the second surface of the second APD.

2. The method as recited in claim 1, wherein establishing the wireless connection with the UE comprises:
establishing the wireless connection with the UE without using the first surface of the first APD and the second surface of the second APD; or
establishing the wireless connection with the UE using a single APD surface, the single APD being the first APD.

3. The method as recited in claim 2, wherein establishing the wireless connection with the UE further comprises:
establishing, with the UE and as the wireless connection, a first wireless connection using wireless transmissions in a first frequency band below 6 gigahertz (GHz) and without using the first surface of the first APD and the second surface of the second APD, and
wherein determining to include at least the first APD and the second APD in the wireless communication path with the UE further comprises:
determining to establish, with the UE, a second wireless connection that uses wireless transmissions in a second frequency band above 6 GHz;
determining UE-location information from the UE using the first wireless connection; and
based on the UE-location information, determining to use the first APD and the second APD in the wireless communication path for the wireless transmissions in the second frequency band.

4. The method as recited in claim 2, wherein establishing the wireless connection with the UE comprises:
establishing, with the UE and as the wireless connection, a wireless connection that uses wireless transmissions in a second frequency band above 6 gigahertz (GHz) and the single APD surface, and
wherein determining to include at least the first APD and the second APD in the wireless communication path with the UE comprises:
obtaining signal-quality or link-quality parameters associated with the wireless transmissions in the second frequency band;
identifying a channel impairment in the wireless connection that uses the wireless transmissions in the second frequency band the band by analyzing the signal-quality or link-quality parameters associated with the wireless transmissions in the second frequency band; and
responsive to identifying the channel impairment, determining to add the second APD to the wireless communication path.

5. The method as recited in claim 1, wherein determining the first surface configuration and the second surface configuration further comprises:
initiating a beam-sweeping procedure using the first APD and the second APD by directing the first APD and/or the second APD to apply a respective beam-sweeping pattern;
obtaining signal-quality or link-quality parameters associated with the beam-sweeping procedure; and
selecting the first surface configuration and the second surface configuration by analyzing the signal-quality or link-quality parameters associated with the beam-sweeping procedure.

6. The method as recited in claim 5, wherein initiating the beam-sweeping procedure further comprises:
transmitting a downlink reference signal as part of the beam-sweeping procedure.

7. The method as recited in claim 6, wherein transmitting the downlink reference signal further comprises:
transmitting one of:
a channel state information reference signal (CSI-RS) or one or more synchronization signal blocks (SSBs).

8. The method as recited in claim 5, wherein receiving the signal-quality or link-quality parameters associated with the beam-sweeping procedure further comprises:
receiving the signal-quality or link-quality parameters from the UE; or
generating the signal-quality or link-quality parameters using a sounding reference signal (SRS) received from the UE.

9. The method as recited in claim 5, wherein initiating the beam-sweeping procedure using the first APD and the second APD further comprising:
directing the first APD to perform the beam-sweeping procedure by:
applying a first set of phase vectors to the first surface in succession based on time information in a first beam-sweeping pattern; or
maintaining an APD-to-APD surface configuration for a duration of the beam-sweeping procedure; and
directing the second APD to apply a second set of phase vectors to the second surface in succession based on time information in a second beam-sweeping pattern.

10. The method as recited in claim 1, wherein determining the first surface configuration for the first surface and the second surface configuration for the second surface further comprises:
determining, as the first surface configuration and the second surface configuration, surface configurations for downlink communications to the UE; or
determining, as the first surface configuration and the second surface configuration, surface configurations for uplink communications from the UE.

11. The method as recited in claim 1, further comprising:
indicating, as the first time information or the second time information, timing offset information.

12. The method as recited in claim 1, further comprising:
assigning a first adaptive phase-changing device radio-network temporary-identifier (APD_RNTI) to the first APD;
assigning a second APD_RNTI to the second APD;
communicating first APD control information to the first APD by scrambling the first APD control information with the first APD_RNTI and transmitting the scrambled first APD control information to the first APD using the APD-PDCCH; and
communicating second APD control information to the second APD by scrambling the second APD control information with the second APD_RNTI and transmitting the scrambled second APD control information to the second APD using the APD-PDCCH.

13. The method as recited in claim 1, further comprising:
transmitting first APD control information to the first APD using an adaptive phase-changing device physical downlink shared channel, APD-PDSCH, and a first APD identifier associated with the first APD; and
transmitting second APD control information to the second APD using the APD-PDSCH and a second APD identifier associated with the second APD.

14. The method as recited in claim 13, further comprising:
directing at least the first APD or the second APD to enable a hybrid automatic repeat request (HARQ) process.

15. A base station comprising:
a processor; and
computer-readable storage media comprising instructions, executable by the processor, to direct the base station to:
  establish a wireless connection with a user equipment (UE);
  determine, based on the wireless connection, to include at least a first adaptive phase-changing device (APD) and a second APD in a wireless communication path with the UE;
  determine a first surface configuration for a first surface of the first APD and a second surface configuration for a second surface of the second APD;
  transmit an indication of the first surface configuration to the first APD over an APD physical downlink control channel (APD-PDCCH) to dynamically configure the first APD on a slot-by-slot basis by directing the first APD to apply the first surface configuration to the first surface based on first timing information;
  direct the second APD to apply the second surface configuration to the second surface based on second timing information; and
  communicate with the UE using wireless transmissions that travel along the wireless communication path that includes the first surface of the first APD and the second surface of the second APD.

16. The base station of claim 15, wherein the instructions to establish the wireless connection with the UE are further executable by the processor to direct the base station to:
  establish the wireless connection with the UE without using the first surface of the first APD and the second surface of the second APD; or
  establish the wireless connection with the UE using a single APD surface, the single APD being the first APD.

17. The base station as recited in claim 16, wherein the instructions to establish the wireless connection with the UE are further executable by the processor to direct the base station to:
  establish, with the UE and as the wireless connection, a first wireless connection using wireless transmissions in a first frequency band below 6 gigahertz (GHz) and without using the first surface of the first APD and the second surface of the second APD, and
  wherein the instructions to determine to include at least the first APD and the second APD in the wireless communication path with the UE are further executable by the processor to direct the base station to:
    determine to establish, with the UE, a second wireless connection that uses wireless transmissions in a second frequency band above 6 GHz;
    determine UE-location information from the UE using the first wireless connection; and
    based on the UE-location information, determine to use the first APD and the second APD in the wireless communication path for the wireless transmissions in the second frequency band.

18. The base station as recited in claim 16, wherein the instructions to establish the wireless connection with the UE are further executable by the processor to direct the base station to:
  establish, with the UE and as the wireless connection, a wireless connection that uses wireless transmissions in a second frequency band above 6 gigahertz (GHz) and the single APD surface, and
  wherein the instructions to determine to include at least the first APD and the second APD in the wireless communication path with the UE are further executable by the processor to direct the base station to:
    obtain signal-quality or link-quality parameters associated with the wireless transmissions in the second frequency band;
    identify a channel impairment in the wireless connection that uses the wireless transmissions in the second frequency band the band by analyzing the signal-quality or link-quality parameters associated with the wireless transmissions in the second frequency band; and
    responsive to the identification of the channel impairment, determine to add the second APD to the wireless communication path.

19. The base station as recited in claim 15, the instructions to determine the first surface configuration and the second surface configuration are further executable by the processor to direct the base station to:
  initiate a beam-sweeping procedure using the first APD and the second APD by directing the first APD and/or the second APD to apply a respective beam-sweeping pattern;
  obtain signal-quality or link-quality parameters associated with the beam-sweeping procedure; and
  select the first surface configuration and the second surface configuration by analyzing the signal-quality or link-quality parameters associated with the beam-sweeping procedure.

20. The base station as recited in claim 19, the instructions to initiating the beam-sweeping procedure are further executable by the processor to direct the base station to:
  transmit a downlink reference signal as part of the beam-sweeping procedure.

* * * * *

UNITED STATES PATENT AND TRADEMARK OFFICE
CERTIFICATE OF CORRECTION

| | | |
|---|---|---|
| PATENT NO. | : 12,316,404 B2 | Page 1 of 1 |
| APPLICATION NO. | : 18/548019 | |
| DATED | : May 27, 2025 | |
| INVENTOR(S) | : Jibing Wang and Erik Richard Stauffer | |

It is certified that error appears in the above-identified patent and that said Letters Patent is hereby corrected as shown below:

In the Claims

Column 35, Line 5, Claim 15, after "station to", delete ";" add --:--

Signed and Sealed this
First Day of July, 2025

Coke Morgan Stewart
*Acting Director of the United States Patent and Trademark Office*